United States Patent
Yoshimura et al.

(10) Patent No.: US 12,385,221 B2
(45) Date of Patent: Aug. 12, 2025

(54) WORK VEHICLE HAVING A CONTROLLER THAT CONTROLS THE HYDRAULIC CYLINDERS AND THE ELECTRICALLY DRIVEN MOTOR ON A BASIS OF A DISTRIBUTION RATIO OF A FIRST TORQUE AND A DISTRIBUTION RATIO OF A SECOND TORQUE

(71) Applicant: HITACHI CONSTRUCTION MACHINERY CO., LTD., Tokyo (JP)

(72) Inventors: Masatoshi Yoshimura, Tokyo (JP); Hiroyuki Kobayashi, Tokyo (JP); Satoru Kaneko, Tokyo (JP); Noritaka Itou, Ibaraki (JP); Satoshi Sekino, Ibaraki (JP); Katsuhiko Tokuda, Ibaraki (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 241 days.

(21) Appl. No.: 18/017,424

(22) PCT Filed: Aug. 2, 2021

(86) PCT No.: PCT/JP2021/028631
§ 371 (c)(1),
(2) Date: Jan. 23, 2023

(87) PCT Pub. No.: WO2022/034825
PCT Pub. Date: Feb. 17, 2022

(65) Prior Publication Data
US 2023/0272598 A1 Aug. 31, 2023

(30) Foreign Application Priority Data
Aug. 11, 2020 (JP) ................ 2020-135701

(51) Int. Cl.
*E02F 9/20* (2006.01)
*E02F 9/22* (2006.01)
(Continued)

(52) U.S. Cl.
CPC .......... *E02F 9/2075* (2013.01); *E02F 9/2095* (2013.01); *E02F 9/2221* (2013.01);
(Continued)

(58) Field of Classification Search
None
See application file for complete search history.

(56) References Cited

U.S. PATENT DOCUMENTS

2009/0223214 A1* 9/2009 Drake .................. E02F 9/225
60/420
2009/0240404 A1* 9/2009 Matsuyawa ........... F02D 29/04
701/50
(Continued)

FOREIGN PATENT DOCUMENTS

JP 2009-052339 A 3/2009
JP 2012-233521 A 11/2012
(Continued)

OTHER PUBLICATIONS

International Search Report of PCT/JP2021/028631 dated Oct. 19, 2021.
(Continued)

*Primary Examiner* — David P. Merlino
(74) *Attorney, Agent, or Firm* — MATTINGLY & MALUR, PC

(57) ABSTRACT

A work vehicle includes: an engine; a hydraulic pump that is driven by the engine; hydraulic cylinders that are extended and contracted by pressurized fluid delivered from the hydraulic pump; a work device that is moved according to the extension/contraction operations of the hydraulic cylin-
(Continued)

ders; a travel device that is driven independently of the work device; an electrically driven motor that is driven by electric power generated by the engine to operate the travel device; and a controller that controls the hydraulic cylinders and the electrically driven motor. The controller controls the output power of the hydraulic pump and the output power of the electrically driven motor by changing the distribution ratios of a first torque consumed by the work device and a second torque consumed by the travel device among torques output by the engine, on the basis of a reaction force received by the vehicle body.

5 Claims, 14 Drawing Sheets

(51) Int. Cl.
  *F16H 61/42* (2010.01)
  *F16H 61/44* (2006.01)
  *F16H 61/472* (2010.01)
  *E02F 9/08* (2006.01)
  *F16H 59/14* (2006.01)

(52) U.S. Cl.
  CPC .............. *F16H 61/42* (2013.01); *F16H 61/44* (2013.01); *F16H 61/472* (2013.01); *B60Y 2200/415* (2013.01); *E02F 9/0841* (2013.01); *F16H 59/14* (2013.01)

(56) References Cited

U.S. PATENT DOCUMENTS

| | | | |
|---|---|---|---|
| 2013/0260962 A1* | 10/2013 | Li | ................. B60W 10/30 477/107 |
| 2013/0288856 A1* | 10/2013 | Li | ................. B60W 10/103 477/110 |
| 2015/0139767 A1 | 5/2015 | Moriki et al. | |
| 2015/0308080 A1 | 10/2015 | Kim et al. | |
| 2015/0361636 A1 | 12/2015 | Yoshizawa et al. | |
| 2016/0097186 A1 | 4/2016 | Yamada et al. | |
| 2018/0079404 A1 | 3/2018 | Kaneko et al. | |
| 2020/0208377 A1 | 7/2020 | Hyodo et al. | |

FOREIGN PATENT DOCUMENTS

| | | |
|---|---|---|
| JP | 2015-140579 A | 8/2015 |
| JP | 2019-120010 A | 7/2019 |
| KR | 2003-0010894 A | 2/2003 |
| WO | 2013/183595 A1 | 12/2013 |
| WO | 2016/151965 A1 | 9/2016 |

OTHER PUBLICATIONS

Korean Office Action received in corresponding Korean Application No. 10-2023-7002972 dated Jun. 21, 2024.
Extended European Search Report received in corresponding European Application No. 21855904.5 dated Jun. 18, 2024.
International Preliminary Report on Patentability received in corresponding International Application No. PCT/JP2021/028631 dated Feb. 23, 2023.

* cited by examiner

WORK VEHICLE HAVING A CONTROLLER THAT CONTROLS THE HYDRAULIC CYLINDERS AND THE ELECTRICALLY DRIVEN MOTOR ON A BASIS OF A DISTRIBUTION RATIO OF A FIRST TORQUE AND A DISTRIBUTION RATIO OF A SECOND TORQUE

TECHNICAL FIELD

The present invention relates to a work vehicle.

BACKGROUND ART

A work vehicle including a travel device for moving a vehicle body and a work device having a bucket and arms for excavating sediment and the like has been known. Such a work vehicle performs excavation work by distributing the power of an engine to the travel device and the work device. At this time, if the travel driving force is large and the work driving force is too small, it becomes difficult to lift the bucket, and the work efficiency is reduced. On the other hand, if the travel driving force is small and the work driving force is too large, the work efficiency is reduced because the bucket cannot be sufficiently penetrated into the sediment or the bucket is lifted before the sediment is sufficiently put in the bucket.

Patent Document 1 discloses a method for automatically setting, on the basis of an average bucket weight after excavation work, the distribution ratios (characteristics P, N, and L) of the travel driving force and the work driving force during the subsequent excavation work.

PRIOR ART DOCUMENT

Patent Document

Patent Document 1: JP-2012-233521-A

SUMMARY OF THE INVENTION

Problem to be Solved by the Invention

According to the technique described in Patent Document 1, in a case where the excavation work is repeatedly performed, the present excavation work is performed on the basis of the distribution ratios of the travel driving force and the work driving force set on the basis of the average bucket weight after the previous excavation work. Thus, in a case where the hardness of an excavation target targeted for the present excavation work is different from the hardness of an excavation target targeted for the previous excavation work, there is a risk that the set distribution ratios deviate from the ranges of the distribution ratios suitable for the excavation of the present excavation target, and the efficiency of the excavation work is reduced.

An object of the present invention is to improve the efficiency of excavation work.

Means for Solving the Problem

A work vehicle according to an aspect of the present invention includes: an engine that is mounted on a vehicle body; a hydraulic pump that is driven by the engine; hydraulic cylinders that are extended and contracted by pressurized fluid delivered from the hydraulic pump; a work device that is moved according to the extension/contraction operations of the hydraulic cylinders; a travel device that is driven independently of the work device; an electrically driven motor that is driven by electric power generated by the engine to operate the travel device; and a controller that controls the hydraulic cylinders and the electrically driven motor. The controller controls output power of the hydraulic pump and output power of the electrically driven motor by changing distribution ratios of a first torque consumed by the work device and a second torque consumed by the travel device among torques output by the engine, on the basis of a reaction force received by the vehicle body.

Advantage of the Invention

According to the present invention, the efficiency of excavation work can be improved.

MODES FOR CARRYING OUT THE INVENTION

Hereinafter, embodiments of the present invention will be described with reference to the drawings. It should be noted that an example in which a work vehicle is an electrically-driven wheel loader will be described in the embodiments.

First Embodiment

Figure 1:
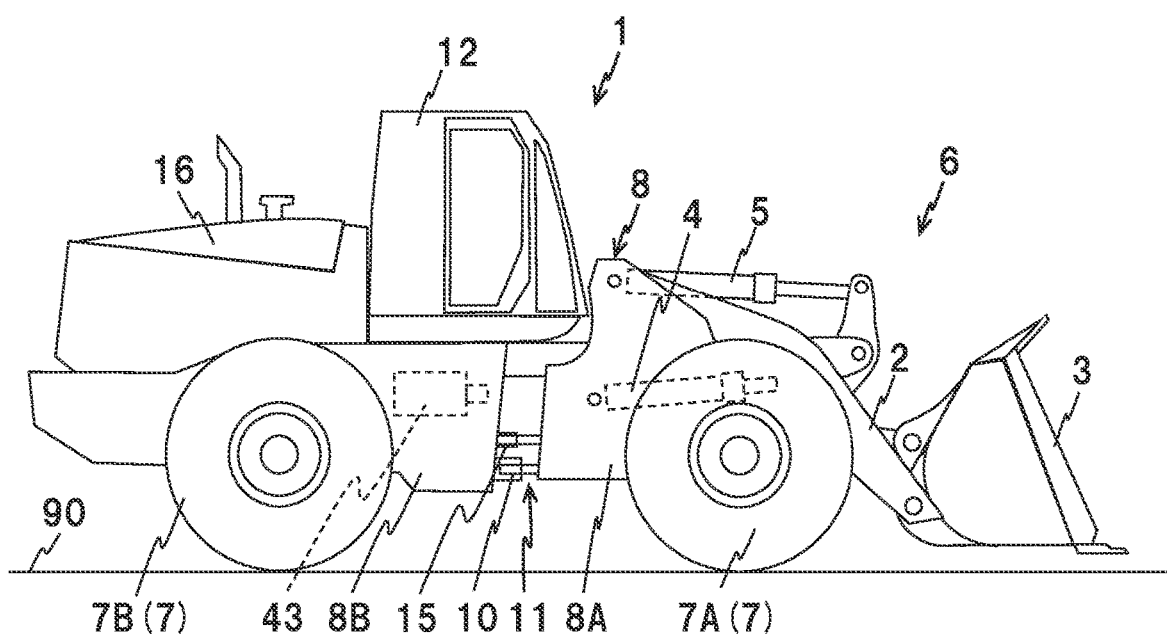
FIG. 1 is a side view of a wheel loader.

A work vehicle according to a first embodiment of the present invention will be described with reference to FIG. 1 to FIG. 9. FIG. 1 is a side view of a wheel loader. As shown in FIG. 1, a wheel loader 1 includes a vehicle body 8 mounted with a travel device 11 and an articulated work device 6 attached to the front of the vehicle body 8. The vehicle body 8 is an articulated steering type (vehicle body bending type) vehicle body and has a front vehicle body 8A, a rear vehicle body 8B, and a center joint 10 coupling the front vehicle body 8A and the rear vehicle body 8B to each other.

On the rear vehicle body 8B, an operation room 12 and an engine room 16 are mounted in the front and the rear, respectively. An engine 20 (see FIG. 2), hydraulic pumps 30A, 30B, and 30C (see FIG. 2) driven by the engine 20, and hydraulic equipment such as valves are mounted in the engine room 16.

Figure 2:
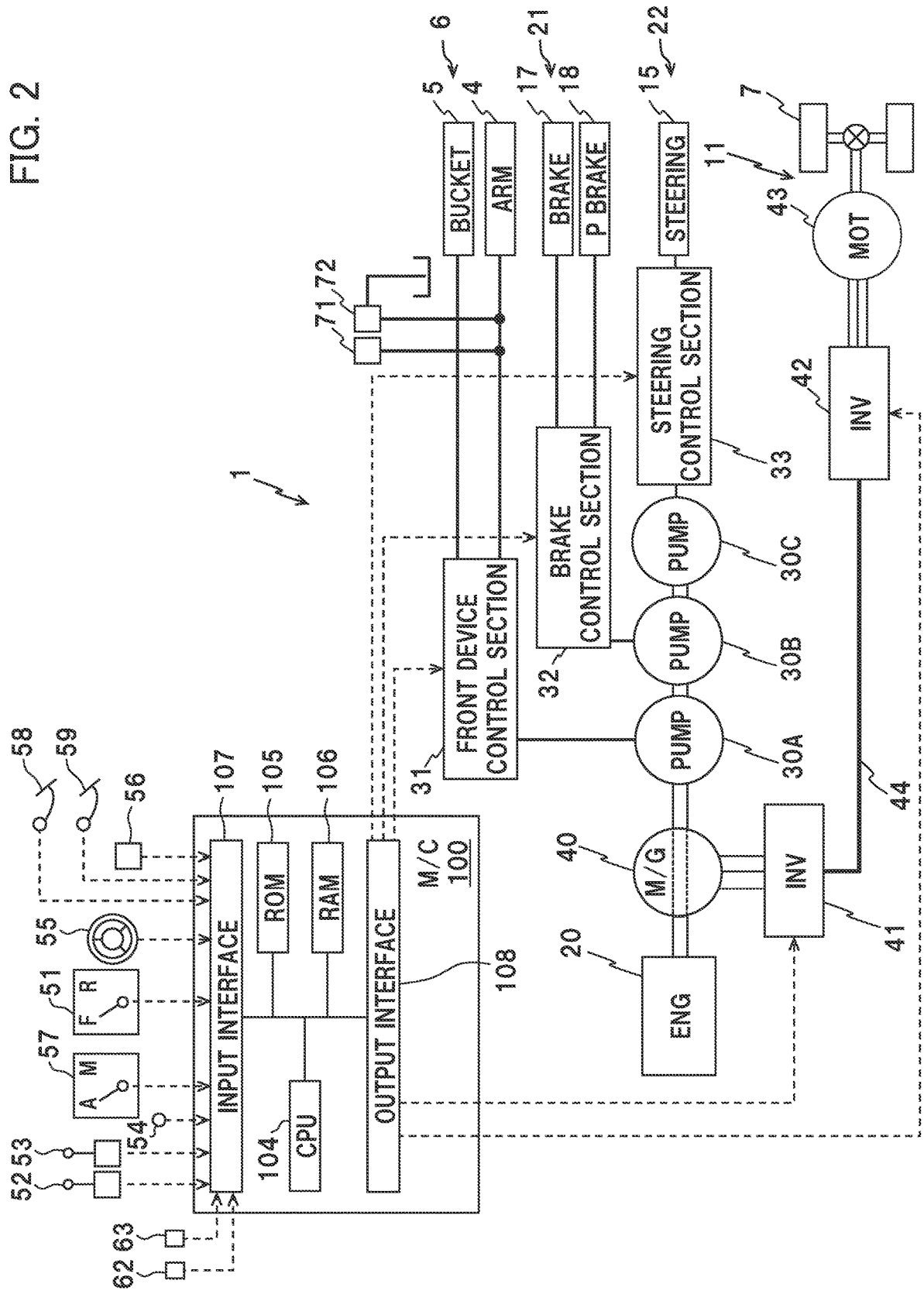
FIG. 2 is a system configuration diagram of the wheel loader.

FIG. 2 is a system configuration diagram of the wheel loader 1. As shown in FIG. 2, the wheel loader 1 includes the engine 20, a power generation motor 40 mechanically connected to the engine 20, the hydraulic pumps 30A, 30B, and 30C mechanically connected to the engine 20, the work device 6 driven by a hydraulic operating fluid delivered from the hydraulic pump 30A, a front device control section 31 controlling the operation of the work device 6, a brake device 21 driven by a hydraulic operating fluid delivered from the hydraulic pump 30B, a brake control section 32 controlling the operation of the brake device 21, a steering device 22 driven by a hydraulic operating fluid delivered from the hydraulic pump 30C, a steering control section 33 controlling the steering device 22, and the travel device 11 driven by the electric power generated by the power generation motor 40.

The work device 6 and the travel device 11 are driven independently of each other by the power of the engine 20. The engine 20 is configured using, for example, an internal combustion engine such as a diesel engine.

As shown in FIG. 1, the work device 6 is attached to the front vehicle body 8A. The work device 6 has lift arms (hereafter, simply referred to as arms) 2 rotatably attached to the front vehicle body 8A and a bucket 3 rotatably attached to the arms 2. The arms 2 are moved according to the extension/contraction operation of arm cylinders 4, which are hydraulic cylinders, and the bucket 3 is moved according to the extension/contraction operation of a bucket cylinder 5, which is a hydraulic cylinder. It should be noted that one arm 2 and one arm cylinder 4 are provided on each of the left and right of the front vehicle body 8A. In addition, in the embodiment, a Z-link type (bell crank type) link mechanism is employed as a link mechanism for operating the bucket 3.

The hydraulic cylinders 4 and 5 are extended and contracted by the hydraulic operating fluid (pressurized fluid) delivered from the hydraulic pump 30A that is rotated by the torque output by the engine 20 (see FIG. 2).

The travel device 11 has front wheels 7A (tires 7) attached to the front vehicle body 8A, rear wheels 7B (tires 7) attached to the rear vehicle body 8B, and a power transmission device that transmits power from the travel motor 43 to the tires 7. The power transmission device includes an axle, a differential device, a propeller shaft, and the like.

The travel motor 43 is an electrically driven motor that is rotationally driven by the electric power generated by the power generation motor 40 rotated by the torque output from the engine 20 and operates the travel device 11. It should be noted that the wheel loader 1 is turned by the steering device 22 having a pair of left and right hydraulic cylinders (hereafter, referred to as steering cylinders) 15 provided so as to couple the front vehicle body 8A and the rear vehicle body 8B to each other.

As shown in FIG. 2, the hydraulic pumps 30A, 30B, and 30C are mechanically connected to the engine 20 and the power generation motor 40. The hydraulic pumps 30A, 30B, and 30C are driven by the torque output from the engine 20 to deliver the hydraulic operating fluids as working fluids. It should be noted that in a case where the power generation motor 40 functions as an electric motor, the hydraulic pumps 30A, 30B, and 30C are driven by the torque output from the engine 20 and the power generation motor 40.

The pressure, flow rate, and flow direction of the hydraulic operating fluid delivered from the hydraulic pump 30A are controlled by the front device control section 31. The pressure, flow rate, and flow direction of the hydraulic operating fluid delivered from the hydraulic pump 30B are controlled by the brake control section 32. The pressure, flow rate, and flow direction of the hydraulic operating fluid delivered from the hydraulic pump 30C are controlled by the steering control section 33.

The wheel loader 1 includes a main controller 100 that is a controller for controlling the hydraulic cylinders 4 and 5 for operating the work device 6 and the travel motor 43 for operating the travel device 11, a power generation inverter (inverter for the power generation motor) 41 that controls the power generation motor 40 on the basis of a power generation voltage command input from the main controller 100, a travel inverter (inverter for the travel motor) 42 that controls the torque of the travel motor 43 on the basis of a travel driving torque command input from the main controller 100, and various operation members (50 to 59) provided in the operation room 12.

In the operation room 12, provided are an arm operation lever 52 for driving the arms 2, a bucket operation lever 53 for driving the bucket 3, a forward/backward switch 51 that is a forward/backward switching device for switching the forward (F) and backward (R) of the vehicle body 8, an accelerator pedal 58 for accelerating the vehicle body 8, a brake pedal 59 for decelerating the vehicle body 8, a steering wheel 55 for instruction on the left/right advancing direction of the vehicle body 8, a mode switching switch 57 that is a switching device for switching a torque distribution mode to either a MANUAL mode or an AUTO mode, a torque distribution ratio setting dial 54 for manually setting the ratio at which the output torque of the engine 20 is distributed to the work device 6 and the travel device 11, and a parking brake switch 56 for operating the parking brake.

The main controller 100 is configured using a microcomputer including a CPU (Central Processing Unit) 104 as an operating circuit, a ROM (Read Only Memory) 105 and a RAM (Random Access Memory) 106 as storage devices, an input interface 107, an output interface 108, and other peripheral circuits. It should be noted that the main controller 100 may be configured using one microcomputer or a plurality of microcomputers.

The ROM 105 of the main controller 100 is a nonvolatile memory such as an EEPROM and stores programs that can execute various computations. That is, the ROM 105 of the main controller 100 is a storage medium that can read programs for realizing the functions of the embodiment. The RAM 106 is a volatile memory and a work memory that directly inputs and outputs data with the CPU 104. The RAM 106 temporarily stores necessary data while the CPU 104 computes and executes a program. It should be noted that the main controller 100 may further include a storage device such as a flash memory or a hard disk drive.

The CPU 104 is a processing device that expands the program stored in the ROM 105 into the RAM 106 to execute computations, and performs a predetermined computation process for signals taken from the input interface 107, the ROM 105, and the RAM 106 according to the program.

An operation signal and a sensor signal are input to the input interface 107. The input interface 107 converts the input signal such that the CPU 104 can compute. The output interface 108 generates a signal for output according to the computation result in the CPU 104, and outputs the signal to the front device control section 31, the brake control section 32, the steering control section 33, the power generation inverter 41, the travel inverter 42, and the like.

The main controller 100 comprehensively controls the front device control section 31, the brake control section 32, the steering control section 33, the power generation inverter 41, and the travel inverter 42 on the basis of the operation signals input by an operator's operation and the sensor signals sensed by various sensors.

The operation signals input to the main controller 100 include an accelerator signal output from the accelerator pedal 58 and indicating the operation amount of the accelerator pedal 58, a brake signal output from the brake pedal 59 and indicating the operation amount of the brake pedal 59, an arm signal output from the arm operation lever 52 and indicating the operation amount of the arm operation lever 52, a bucket signal output from the bucket operation lever 53 and indicating the operation amount of the bucket operation lever 53, a steering signal output from the steering wheel 55 and indicating the operation amount of the steering wheel 55, an advancing direction signal output from the forward/backward switch 51 and indicating the operation position of the forward/backward switch 51, and the like. In addition, the operation signals input to the main controller 100 include a mode switching signal output from the mode switching switch 57 and indicating the operation position of the mode switching switch 57, and a ratio setting signal output from the torque distribution ratio setting dial 54 and indicating the operation position of the torque distribution ratio setting dial 54.

The sensor signals input to the main controller 100 include a signal indicating the angle sensed by an arm relative angle sensor 62 provided on a coupling shaft coupling the vehicle body 8 and the arms 2 to each other, and a signal indicating the angle sensed by a bucket relative angle sensor 63 provided on a coupling shaft coupling the arms 2 and the bucket 3 to each other. The arm relative angle sensor 62 is a potentiometer that senses the relative angle (inclined angle) of the arms 2 to the vehicle body 8 and outputs a signal indicating the sensed angle to the main controller 100. The bucket relative angle sensor 63 is a potentiometer that senses the relative angle (inclined angle) of the bucket 3 to the arms 2 and outputs a signal indicating the sensed angle to the main controller 100. Since the angle of the vehicle body 8 relative to the ground (travel surface) is constant, the angle sensed by the arm relative angle sensor 62 can be said to correspond to the relative angle (inclined angle) of the arms 2 to the ground.

In addition, the sensor signals input to the main controller 100 include a signal indicating the vehicle velocity sensed by a vehicle velocity sensor 61. The vehicle velocity sensor 61 senses the vehicle velocity (travel velocity) of the wheel loader 1 and outputs a signal indicating the sensed vehicle velocity to the main controller 100. Further, the sensor signals input to the main controller 100 include signals indicating the revolution speeds of the engine 20, the power generation motor 40, the hydraulic pumps 30A, 30B, and 30C, and the travel motor 43 sensed by a plurality of revolution speed sensors, and signals indicating the delivery pressures of the hydraulic pumps 30A, 30B, and 30C, the pressure (load pressure) of the hydraulic cylinder, and the like sensed by a plurality of pressure sensors.

The main controller 100 outputs a front device control command on the basis of the operation directions and the operation amounts of the operation levers 52 and 53. The front device control section 31, on the basis of the front device control command from the main controller 100, adjusts the pressure, velocity, and direction of the hydraulic operating fluid delivered from the hydraulic pump 30A to operate the arm cylinders 4 and the bucket cylinder 5. The front device control section 31 has a direction control valve for controlling the flow of the hydraulic operating fluid delivered from the hydraulic pump 30A, a solenoid valve for generating a pilot pressure input into the pilot chamber of the direction control valve, and the like.

The main controller 100 outputs a brake control command on the basis of the operation amount of the brake pedal 59 and the operation position of the parking brake switch 56. The brake control section 32, on the basis of the brake control command from the main controller 100, adjusts the pressure, velocity, and direction of the hydraulic operating fluid delivered from the hydraulic pump 30B to operate hydraulic cylinders 17 and 18 for functioning the brake 13 and the parking brake 14. The brake control section 32 has a direction control valve for controlling the flow of the hydraulic operating fluid delivered from the hydraulic pump 30B, a solenoid valve for generating a pilot pressure input into the pilot chamber of the direction control valve, and the like.

The main controller 100 outputs a steering control command on the basis of the operation direction and the operation amount of the steering wheel 55. The steering control section 33, on the basis of the steering control command from the main controller 100, adjusts the pressure, velocity, and direction of the hydraulic operating fluid delivered from the hydraulic pump 30C to operate the steering cylinders 15. The steering control section 33 has a direction control valve for controlling the flow of the hydraulic operating fluid delivered from the hydraulic pump 30C, a solenoid valve for generating a pilot pressure input into the pilot chamber of the direction control valve, and the like.

As described above, in the embodiment, the hydraulic pumps 30A, 30B, and 30C are driven by the torque output from the engine 20, and the work device 6, the brake device 21, and the steering device 22 are driven by the hydraulic operating fluids delivered from the hydraulic pumps 30A, 30B, and 30C.

The power generation inverter 41 and the travel inverter 42 are connected to each other via a DC section (DC bus) 44. It should be noted that the wheel loader 1 according to the embodiment does not include a power storage device connected to the DC section 44. The power generation inverter 41, on the basis of a power generation voltage command from the main controller 100, controls the bus voltage of the DC section 44 by using the electric power supplied from the power generation motor 40. The travel inverter 42, on the basis of the travel driving torque command of the main controller 100, drives the travel motor 43 by using the electric power of the DC section 44.

As described above, in the embodiment, the power generation motor 40 is driven by the torque output from the engine 20, and the travel motor 43 is driven by the electric power generated by the power generation motor 40.

When the arm operation lever 52 is operated, the arms 2 are rotated (moved up and down) in the up and down directions by the extension/contraction operation of the arm cylinders 4. When the bucket operation lever 53 is operated, the bucket 3 is rotated (crowding operation or dump operation) in the up and down directions by the extension/contraction operation of the bucket cylinder 5.

When the steering wheel 55 is operated, the front vehicle body 8A is refracted (turned) left and right with the center joint 10 in the center against the rear vehicle body 8B, according to the extension/contraction operation of the steering cylinders 15. The tires 7 are rotated by the driving of the travel motor 43 to move the wheel loader 1 forward and backward.

When the accelerator pedal 58 is stepped on in a state where the forward/backward switch 51 is operated to the forward side, the tires 7 rotate in the forward direction and the vehicle body 8 travels forward. When the accelerator pedal 58 is stepped on in a state where the forward/backward switch 51 is operated to the backward side, the tires 7 rotate in the backward direction and the vehicle body 8 travels backward.

The mode switching switch 57 is a mode switch operation section that can be manually switched between an AUTO mode (first control mode) in which the work driving torque and the travel driving torque are controlled on the basis of a reaction force $F_R$ acting on the vehicle body 8 of the wheel loader 1 and a MANUAL mode (second control mode) in which the work driving torque and the travel driving torque are controlled such that the ratios of the work driving torque and the travel driving torque are held at predetermined ratios regardless of the reaction force $F_R$.

It should be noted that the work driving torque corresponds to the torque (first torque) consumed by the work device 6 among those output from the engine 20. That is, in the embodiment, the work driving torque corresponds to the input torque of the hydraulic pump 30A. The travel driving torque corresponds to the torque (second torque) consumed by the travel device 11 among those output from the engine 20. That is, in the embodiment, the travel driving torque corresponds to the output torque of the travel motor 43.

The mode switching switch 57 has an AUTO mode position and a MANUAL mode position. Where the mode switching switch 57 is operated to the AUTO mode position, a signal indicating that the AUTO mode is selected is output to the main controller 100. In this case, the main controller 100 sets the AUTO mode as the torque distribution mode. Where the mode switching switch 57 is operated to the MANUAL mode position, a signal indicating that the MANUAL mode is selected is output to the main controller 100. In this case, the main controller 100 sets the MANUAL mode as the torque distribution mode.

The torque distribution ratio setting dial 54 is an operation member for setting a setting value $\eta_{CS}$ of the torque distribution ratio used when the torque distribution mode is set to the MANUAL mode. The main controller 100, on the basis of the operation position of the torque distribution ratio setting dial 54, sets the setting value $\eta_{CS}$ of the distribution ratio of the travel driving torque. Further, the main controller 100 sets a setting value $\eta_{LS}$ of the distribution ratio of the work driving torque. The main controller 100 subtracts the setting value $\eta_{CS}[\%]$ of the distribution ratio of the travel driving torque from 100[%] to calculate the setting value $\eta_{LS}$ of the distribution ratio of the work driving torque (100−$\eta_{CS}$=$\eta_{LS}$ [%]). The main controller 100 stores the setting values $\eta_{CS}$ and $\eta_{LS}$ of the torque distribution ratios in the ROM 105.

Figure 3:
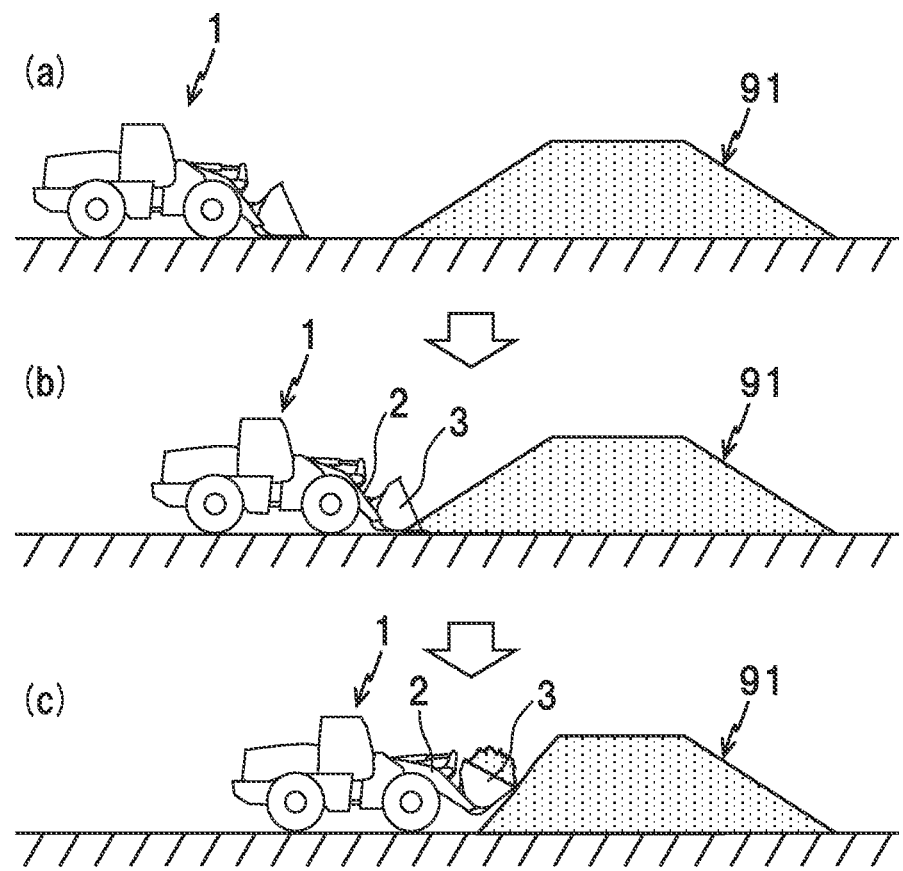
FIG. 3 is diagrams for explaining the basic excavation work of the wheel loader.

Next, the basic excavation work of the wheel loader 1 will be described with reference to FIG. 3. In the excavation work of the wheel loader 1, the wheel loader 1 is first advanced toward an excavation target 91 such as a sediment pile or a natural ground as shown in FIG. 3(a). Next, as shown in FIG. 3(b), the bucket 3 is penetrated into the excavation target 91 in such a manner as to plunge into the excavation target 91, and the arms 2 and the bucket 3 are operated to put objects to be carried such as sediment into the bucket 3. Finally, as shown in FIG. 3(c), the excavation work is completed by scooping up (performing the crowding operation) the bucket 3 toward the operator so as not to spill the objects to be carried such as sediment put in the bucket 3. After the excavation work is completed, the wheel loader 1 is moved backward once and advanced toward a conveying vehicle such as a dump truck. At this time, the operator operates the steering wheel 55 to advance the wheel loader 1 toward the dump truck while raising the arms 2 by operating the arm operation lever 52. After stopping the wheel loader 1 in front of the dump truck, the operator loads the objects to be carried in the bucket 3 onto the cargo bed of the dump truck (that is, releases the sediment in the bucket 3) by operating the bucket operation lever 53 to allow the bucket 3 to perform the dump operation. When the loading work is completed, the operator moves the wheel loader 1 backward again and returns to the original position.

A series of work including the excavation work and the loading work accounts for the majority of the whole work time of the wheel loader 1. Therefore, in order to improve the work efficiency of the wheel loader 1, it is effective to improve the efficiency of the series of work. It should be noted that the work efficiency corresponds to, for example, the weight [ton/h] of the excavated material loaded onto the conveying vehicle per unit time in the series of work including the excavation work and the loading work, and a larger weight means that a more amount of materials can be excavated in a shorter time.

Here, if the balance between the driving force (travel driving force) of the travel device 11 and the driving force (work driving force) of the work device 6 is poor, the efficiency of the excavation work is reduced. For example, where the travel driving force is insufficient and the work driving force is excessive, the work efficiency is reduced because the bucket 3 cannot be sufficiently penetrated into the excavation target 91 or the bucket 3 is lifted above the excavation target 91 before the sediment is sufficiently put in the bucket 3. On the other hand, where the work driving force is insufficient and the travel driving force is excessive, the work efficiency is reduced because it takes time to lift the bucket 3. As described above, if the balance between the travel driving force and the work driving force is poor, the work efficiency is reduced.

Accordingly, in the embodiment, the efficiency of the excavation work in the series of work is improved by appropriately balancing the driving force (travel driving force) of the travel device 11 required to appropriately penetrate the bucket 3 into the excavation target 91 and the driving force (work driving force) of the work device 6 required to load a large amount of sediment into the bucket 3 in a short time.

It should be noted that the appropriate balance between the travel driving force and the work driving force changes depending on the hardness of the excavation target 91. As the hardness of the excavation target 91 is greater, a larger travel driving force is required. The influence of the hardness of the excavation target 91 appears in the reaction force received by the vehicle body 8 of the wheel loader 1 from the excavation target 91 during the excavation work. The reaction force acting on the vehicle body 8 of the wheel loader 1 becomes larger as the hardness of the excavation target 91 is greater. In the embodiment, the work efficiency is improved by adjusting the balance between the travel driving force and the work driving force on the basis of the reaction force acting on the vehicle body 8 of the wheel loader 1 during the excavation work.

Figure 4:
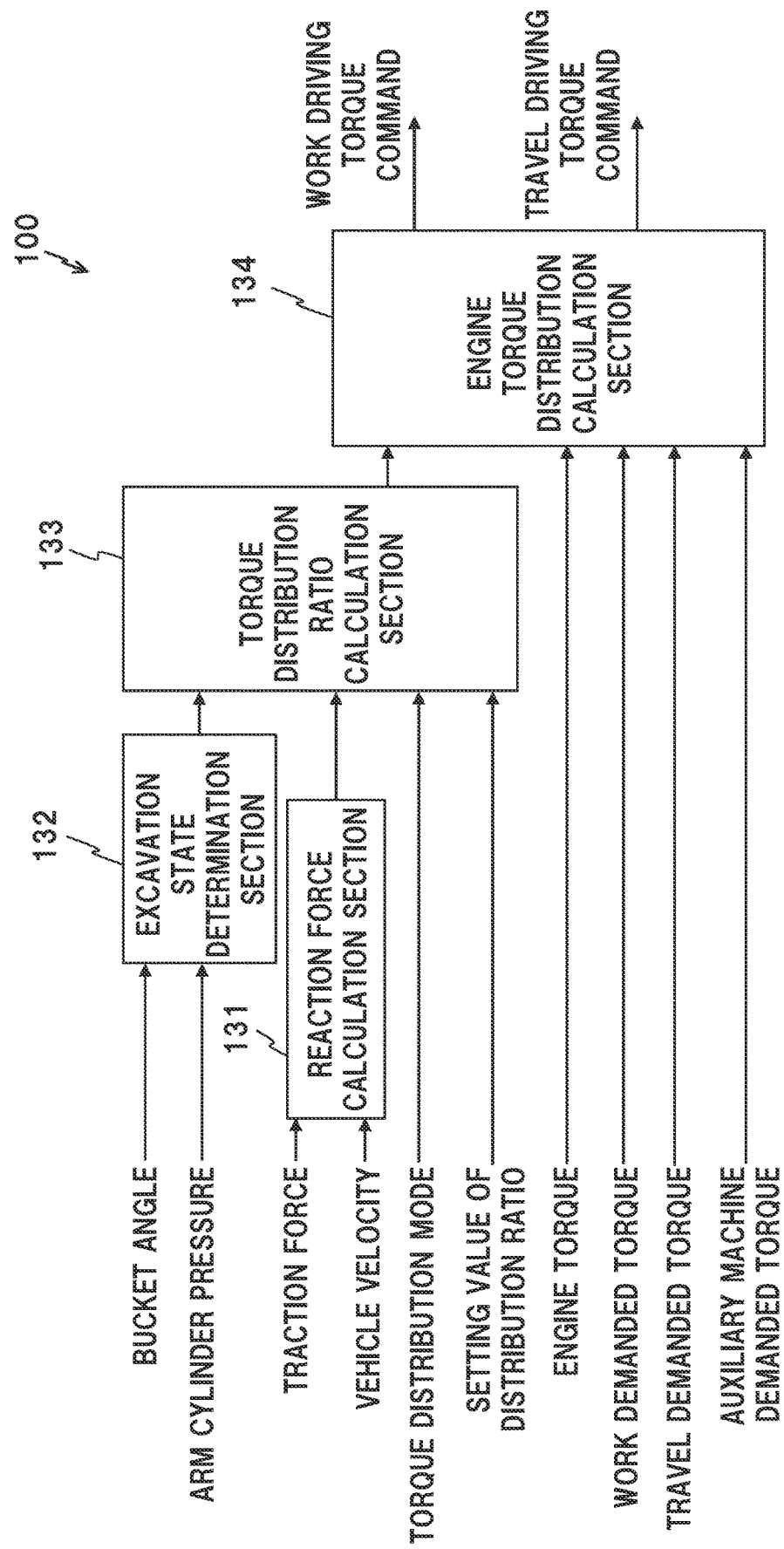
FIG. 4 is a functional block diagram of a main controller according to a first embodiment.

FIG. 4 is a functional block diagram of the main controller 100. As shown in FIG. 4, the main controller 100, by executing the programs stored in the ROM 105, functions as a reaction force calculation section 131 that calculates the reaction force $F_R$ received by the vehicle body 8 of the wheel loader 1, an excavation state determination section 132 that determines whether or not the wheel loader 1 is in the state of performing the excavation work, a torque distribution ratio calculation section 133 that decides the distribution ratios $\eta_I$ and $\eta_C$ of the work driving torque and the travel driving torque on the basis of the reaction force $F_R$ calculated by the reaction force calculation section 131, and an engine torque distribution calculation section 134 that decides a work driving torque command for controlling the work driving torque and a travel driving torque command for controlling the travel driving torque on the basis of the distribution ratios $\eta_I$ and $\eta_C$ decided by the torque distribution ratio calculation section 133.

The reaction force calculation section 131, on the basis of the traction force $F_P$ and the vehicle velocity v of the wheel loader 1, calculates the reaction force $F_R$ received by the vehicle body 8 of the wheel loader 1. An example of a method for calculating the reaction force $F_R$ will be described. The reaction force $F_R$ is obtained by the following equation (1) using a relation between momentum and an impulse.

[Equation 1]

$$F_R = F_P - \frac{mv_1 - mv_0}{t_1 - t_0} \quad (1)$$

Here, m is the mass of the wheel loader 1, $t_0$ is a reference time, $t_1$ is a time after a predetermined time elapses from the reference time $t_0$, $v_0$ is the vehicle velocity of the wheel loader 1 at the reference time $t_0$, and $v_1$ is the vehicle velocity of the wheel loader 1 at the time $t_1$. It should be noted that although the vehicle velocity of the wheel loader 1 is sensed by the vehicle velocity sensor 61 in the embodiment, a rotary encoder that senses the revolution speed of a shaft configuring the power transmission device may be provided to compute the vehicle velocity on the basis of information sensed by the rotary encoder.

The traction force $F_P$ correlated with the travel driving force generated by the travel motor 43 and is obtained by the following equation (2) on the basis of, for example, the output torque (travel driving torque) Tm of the travel motor 43 at the time $t_1$, a general reduction ratio $\lambda$, and the diameter Dt of the tire 7.

[Equation 2]

$$F_P = \frac{Tm \cdot \lambda}{Dt} \cdot c \quad (2)$$

It should be noted that the general reduction ratio A is the ratio of the revolution speed of the engine 20 to the revolution speed of the tires 7, and where a transmission is provided, it is calculated by multiplying the gear ratio of the transmission by the reduction ratio (differential ratio). In the equation, c is a factor for unit conversion. The travel driving torque (motor output torque) Tm may be sensed by a torque sensor or computed from the motor current sensed by a current sensor.

The reaction force $F_R$ calculated during the excavation work is dominated by the repulsive force acting on the wheel loader 1 from the excavation target 91 and is affected by the hardness of the excavation target 91. The reference time $t_0$ is the time when the wheel loader 1 plunged into the excavation target 91 (the time when the bucket 3 started penetrating the excavation target 91).

The main controller 100 determines whether or not the wheel loader 1 has plunged into the excavation target 91 (that is, whether or not the bucket 3 has started penetrating the excavation target 91) on the basis of the operation amount of the accelerator pedal 58 and the time change ratio of the vehicle velocity v of the wheel loader 1. When the main controller 100 determines that the wheel loader 1 has plunged into the excavation target 91, a plunge flag is set to ON. In addition, the main controller 100 sets the time when the plunge flag has been set to ON as the reference time $t_0$. It should be noted that the plunge flag is set to OFF when an excavation determination flag to be described later is set to OFF.

The main controller 100 calculates the time change ratio D (=(vb−va)/(tb−ta)) of the vehicle velocity v by dividing a difference (vb−va) between the previous value va and the current value vb of the vehicle velocity v, which is repeatedly sensed in a predetermined control cycle, by a time $\Delta t$ (=tb−ta) from a time ta when the previous value va has been sensed to a time tb when the current value vb has been sensed. When the operation amount of the accelerator pedal 58 is equal to or more than a predetermined threshold value and the time change ratio D of the vehicle velocity v is equal to or more than a predetermined threshold value, the main controller 100 determines that the wheel loader 1 has plunged into the excavation target 91. When the operation amount of the accelerator pedal 58 is less than the predetermined threshold value or when the time change ratio D of the vehicle velocity v is less than the predetermined threshold value, the main controller 100 determines that the wheel loader 1 has not plunged into the excavation target 91.

The excavation state determination section 132 determines, on the basis of the angle (hereinafter, also referred to as a bucket angle) $\theta$ of the bucket 3 and the pressure (hereinafter, also referred to as a bottom pressure) Pa of the bottom-side hydraulic fluid chamber of the arm cylinder 4, whether or not the wheel loader 1 is in the state of performing the excavation work. The bottom pressure Pa of the arm cylinder 4 is sensed by a pressure sensor 71 provided in a hydraulic fluid line connecting the bottom-side hydraulic fluid chamber (not shown) of the arm cylinder 4 and the front device control section 31 to each other as shown in FIG. 2. The pressure sensor 71 outputs a sensed signal to the main controller 100.

Figure 5:
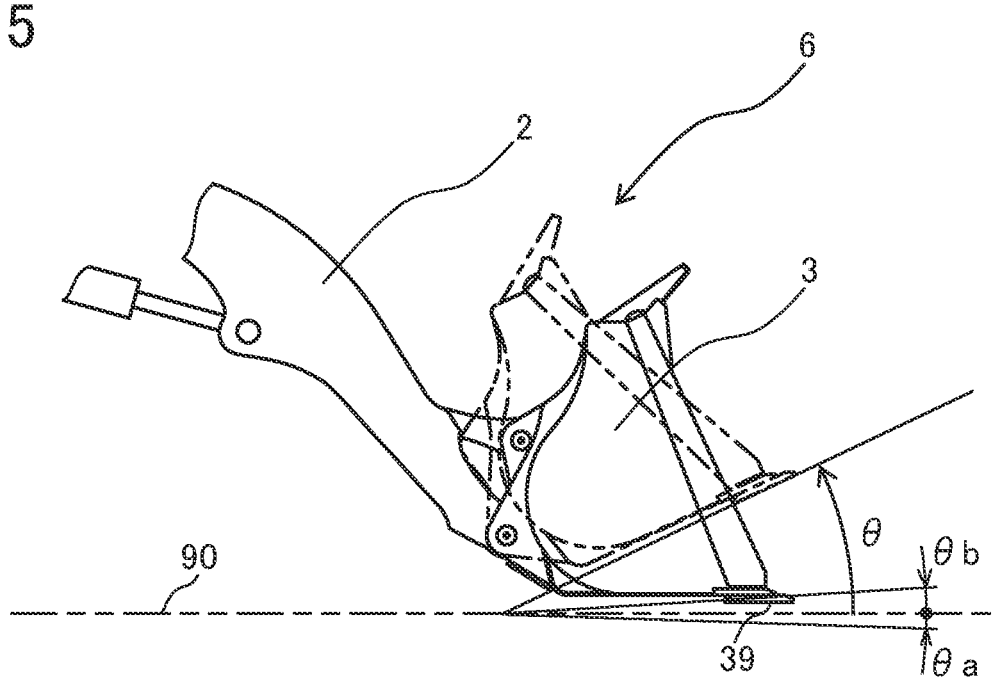
FIG. 5 is a diagram for explaining a bucket angle θ.

FIG. 5 is a diagram for explaining the bucket angle $\theta$. As shown in FIG. 5, the bucket angle $\theta$ is the inclined angle of the bucket 3 from a reference surface 90. In the embodiment, the reference surface 90 is a surface set parallel to the ground (travel surface). In a state where the bottom surface of a blade section 39 of the bucket 3 is parallel to the reference surface 90, the bucket angle $\theta$ is 0[°]. When the bucket 3 is rotated by the crowding operation, the bucket angle $\theta$ increases with the rotation. In other words, when the bucket 3 is rotated by the dump operation, the bucket angle $\theta$ decreases with the rotation. The bucket angle $\theta$ is calculated by the main controller 100 on the basis of the relative angle of the arms 2 to the reference surface 90 sensed by the arm relative angle sensor 62 and the relative angle of the bucket 3 to the arms 2 sensed by the bucket relative angle sensor 63.

The excavation state determination section 132, when the bucket angle θ is within a preset angle range (a lower threshold value θa to an upper threshold value θb) and the bottom pressure Pa of the arm cylinder 4 is equal to or more than a preset pressure threshold value Pa0, determines that the excavation work has been started and sets the excavation determination flag to ON. The excavation determination flag is set to ON when the wheel loader 1 is in the state of performing the excavation work and is set to OFF when the excavation work is finished.

The lower threshold value θa and the upper threshold value θb defining the angle range are set on the basis of the plunging posture of the work device 6. The plunging posture of the work device 6 is a posture in which the bucket 3 is approximately parallel to the travel surface (ground) in the vicinity of the travel surface (ground). The lower threshold value θa and the upper threshold value θb are stored in advance in the ROM 105.

The bottom pressure Pa of the arm cylinder 4 rises due to the plunging of the wheel loader 1 into the excavation target 91. The pressure threshold value Pa0 is stored in advance in the ROM 105. As the pressure threshold value Pa0, it is possible to employ, for example, a value about twice the bottom pressure of the arm cylinder 4 supporting the work device 6 whose bucket 3 is empty and which is in the plunging posture.

That is, the excavation state determination section 132 determines that the excavation work has been started when the plunging of the wheel loader 1 into the excavation target 91 is sensed by the rise of the arm cylinder pressure in a state where the work device 6 is in the plunging posture.

The excavation state determination section 132, after it is determined that the excavation work has been started, determines that the excavation work has been finished and sets the excavation determination flag to OFF when the bucket angle θ becomes an angle threshold value θe (for example, about 30°) or more. It should be noted that the main controller 100 also sets the plunge flag to OFF when the excavation determination flag is set to OFF. The angle threshold value θe is a threshold value for determining whether or not the excavation work has been finished, and it is possible to employ, for example, the bucket angle θ when the crowding operation of the bucket 3 is completed and in a state where the bucket 3 is in the conveyance posture. That is, the excavation state determination section 132 determines that the excavation work has been finished when sensing the bucket 3 in the conveyance posture after it is determined that the excavation work has been started.

The torque distribution ratio calculation section 133 calculates the distribution ratio $\eta_I$ [%] of the work driving torque and the distribution ratio $\eta_C$ [%] of the travel driving torque on the basis of the reaction force $F_R$ calculated by the reaction force calculation section 131, the excavation determination flag set by the excavation state determination section 132, and the torque distribution mode. The distribution ratio $\eta_I$ of the work driving torque takes a value of 0 to 100%. Similarly, the distribution ratio $\eta_C$ of the travel driving torque takes a value of 0 to 100%. The sum of the distribution ratio $\eta_I$ of the work driving torque and the distribution ratio $\eta_C$ of the travel driving torque is 100[%].

The torque distribution ratio calculation section 133, when the AUTO mode is set as the torque distribution mode, sets the distribution ratios $\eta_I$ and $\eta_C$ on the basis of the reaction force $F_R$ calculated by the reaction force calculation section 131.

Figure 6:
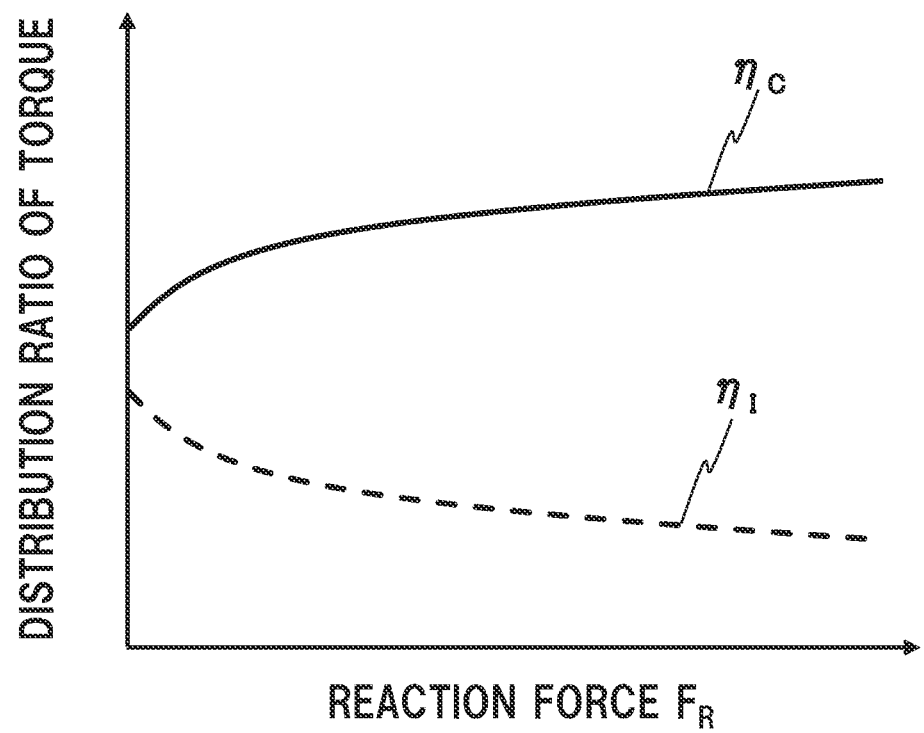
FIG. 6 is a diagram for showing a torque distribution ratio table according to the first embodiment.

FIG. 6 is a diagram for showing a torque distribution ratio table for deciding the distribution ratio $\eta_C$ of the travel driving torque and the distribution ratio $\eta_I$ of the work driving torque. As shown by the solid line in FIG. 6, the torque distribution ratio table is a table in which the reaction force $F_R$ received by the vehicle body 8 of the wheel loader 1 is associated with the distribution ratio $\eta_C$ of the travel driving torque. It should be noted that the distribution ratio $\eta_I$ of the work driving torque is indicated by the broken line in FIG. 6.

The torque distribution ratio table shown in FIG. 6 is stored in advance in the ROM 105 of the main controller 100. As shown by the solid line in FIG. 6, the torque distribution ratio table is a table having characteristics in which as the reaction force $F_R$ becomes larger, the distribution ratio $\eta_C$ of the travel driving torque becomes larger. In addition, the torque distribution ratio table is set such that as the reaction force $F_R$ becomes larger, the ratio (inclination) of an increase in the distribution ratio $\eta_C$ to an increase in the reaction force $F_R$ becomes smaller. Accordingly, the travel driving force can be quickly increased according to an increase in the reaction force $F_R$ when the wheel loader 1 is plunged into the excavation target 91. The torque distribution ratio table is defined in advance by experiments and the like.

The torque distribution ratio calculation section 133, when the excavation determination flag is set to ON, refers to the distribution ratio table of the travel driving torque shown by the solid line in FIG. 6 and calculates the distribution ratio $\eta_C$ of the travel driving torque on the basis of the reaction force $F_R$ calculated by the reaction force calculation section 131. In addition, the torque distribution ratio calculation section 133 subtracts the distribution ratio $\eta_C$ [%] of the travel driving torque from 100[%] to calculate the distribution ratio $\eta_I$ of the work driving torque (100–$\eta_C$=$\eta_I$ [%]) Since the distribution ratio $\eta_C$ of the travel driving torque becomes larger as the reaction force $F_R$ becomes larger, the distribution ratio $\eta_I$ of the work driving torque becomes smaller as the reaction force $F_R$ becomes larger.

Therefore, when the AUTO mode is set as the torque distribution mode, the distribution ratios $\eta_C$ and $\eta_I$ change in real time according to the change in the reaction force $F_R$ while the wheel loader 1 is performing the excavation work.

The torque distribution ratio calculation section 133, when the MANUAL mode is set as the torque distribution mode, sets setting values $\eta_{CS}$ and $\eta_{IS}$ of the distribution ratios stored in the ROM 105 as the distribution ratios $\eta_C$ and $\eta_I$ ($\eta_C$=$\eta_{CS}$ and $\eta_I$=$\eta_{IS}$). That is, when the MANUAL mode is set, the distribution ratios $\eta_C$ and $\eta_I$ are held at constant values even if the reaction force $F_R$ changes.

The engine torque distribution calculation section 134 calculates a work driving torque command $T_{I\_COM}$ and a travel driving torque command $T_{C\_COM}$ on the basis of the distribution ratios $\eta_C$ and $\eta_I$ calculated by the torque distribution ratio calculation section 133, an engine output power torque TE, an auxiliary machine demanded torque $T_{AUX\_REQ}$, a work demanded torque $T_{I\_REQ}$, and a travel demanded torque $T_{C\_REQ}$.

The engine output power torque TE, the auxiliary machine demanded torque $T_{AUX\_REQ}$, the work demanded torque $T_{I\_REQ}$, and the travel demanded torque $T_{C\_REQ}$ are calculated by the main controller 100. The engine output power torque TE is the maximum torque that can be output at the current engine revolution speed. The main controller 100 refers to an engine output power torque curve stored in the ROM 105 and calculates the engine output power torque TE on the basis of the engine revolution speed sensed by an engine revolution speed sensor. The auxiliary machine demanded torque $T_{AUX\_REQ}$ is calculated according to the operation states of a plurality of auxiliary machines operated by the electric power generated by the power generation motor 40. The main controller 100 sets a target value (for example, 1800 rpm) of the engine revolution speed. The target value of the engine revolution speed set by the main controller 100 is output to an engine controller that is not shown in the drawing. The engine controller controls a fuel injector (not shown) such that the engine revolution speed sensed by the engine revolution speed sensor becomes the target value.

Figure 7A:
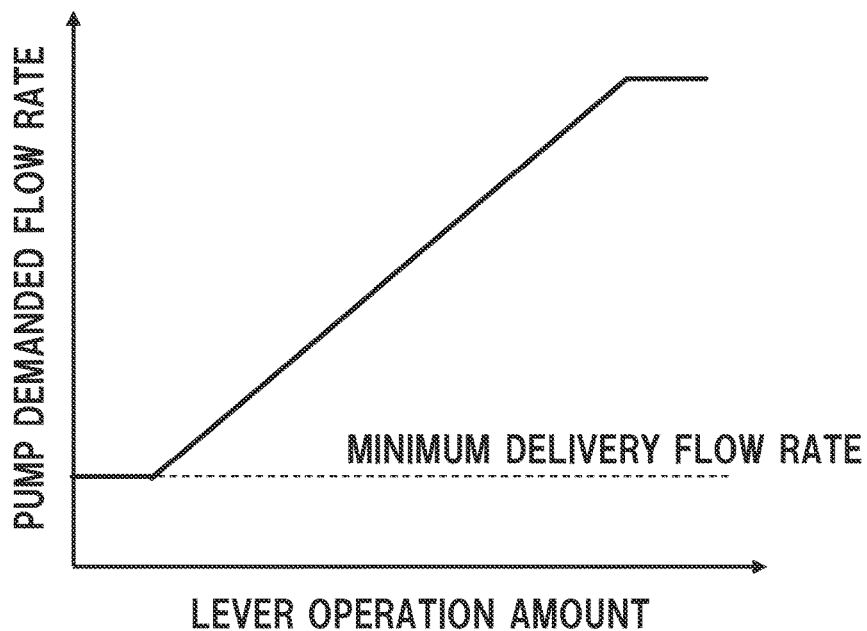
FIG. 7A is a diagram for showing an example of a pump demanded map used to calculate a pump demanded flow rate.

The main controller 100 calculates the work demanded torque $T_{I\_REQ}$ on the basis of the operation amount of the arm operation lever 52 and the operation amount of the bucket operation lever 53. FIG. 7A is a diagram for showing an example of a pump demanded map used to calculate a pump demanded flow rate. The pump demanded map is stored in advance in the ROM 105 of the main controller 100. The main controller 100 refers to the pump demanded flow rate map shown in FIG. 7A and decides the pump demanded flow rate on the basis of the lever operation amount (lever signal). The pump demanded flow rate map is set such that the pump demanded flow rate is approximately proportional to the lever operation amount. The pump demanded flow rate becomes larger as the lever operation amount becomes larger. It should be noted that as the pump demanded flow rate maps, there are a map on the basis of the operation amount of the arm operation lever 52 and a map on the basis of the operation amount of the bucket operation lever 53, and the larger flow rate among those decided by the respective maps is decided as the pump demanded flow rate.

The main controller 100 computes hydraulic demanded power on the basis of the pump demanded flow rate and the delivery pressure of the hydraulic pump 30A sensed by the pressure sensor, and calculates the work demanded torque $T_{I\_REQ}$ on the basis of the hydraulic demanded power and the revolution speed of the engine 20 sensed by the revolution speed sensor. The work demanded torque $T_{I\_REQ}$ becomes larger as the lever operation amount becomes larger.

Figure 7B:
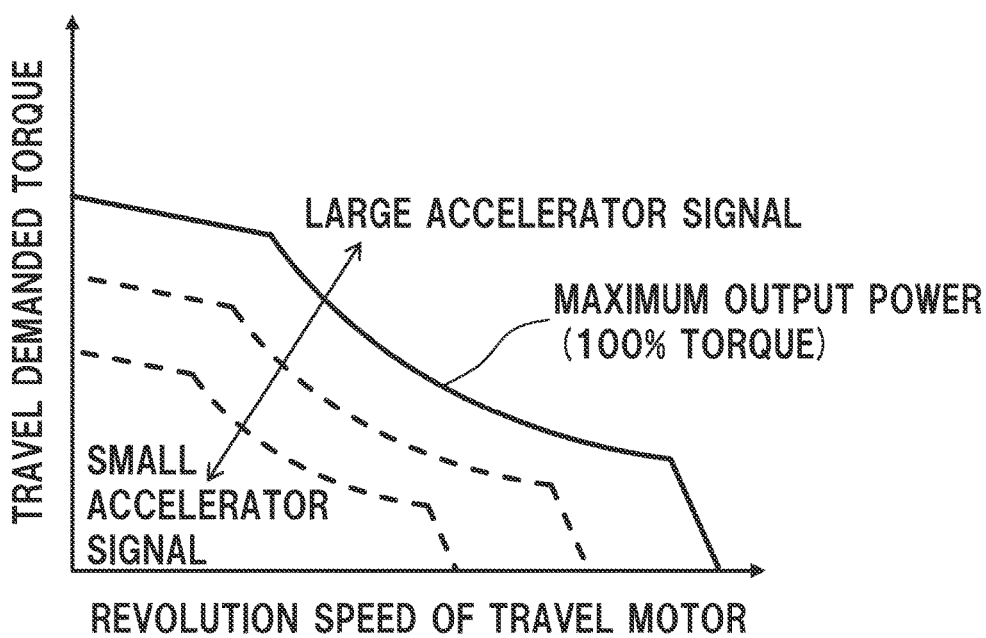
FIG. 7B is a diagram for showing an example of a torque map of a travel motor used to calculate a travel demanded torque.

The main controller 100 calculates the travel demanded torque $T_{C\_REC}$ on the basis of the revolution speed of the travel motor 43 and the operation amount (accelerator signal) of the accelerator pedal 58. FIG. 7B is a diagram for showing an example of a torque map of the travel motor 43 used to calculate the travel demanded torque. The torque map is stored in advance in the ROM 105 of the main controller 100. A plurality of torque maps (torque curves) according to the accelerator signals are stored in the ROM 105 such that the torque of the travel motor 43 increases or decreases according to an increase or decrease in the accelerator signal. The torque map is set such that as the accelerator signal becomes larger, the travel demanded torque $T_{C\_REC}$ becomes larger, and as the revolution speed of the travel motor 43 becomes faster, the travel demanded torque $T_{C\_REC}$ becomes smaller.

The main controller 100 selects a torque map (torque curve) corresponding to the magnitude of the accelerator signal (the magnitude of the operation amount of the accelerator pedal 58) and decides the travel demanded torque $T_{C\_REC}$ on the basis of the revolution speed of the travel motor 43. For example, when the accelerator pedal 58 is fully operated (when the accelerator signal is maximum), the torque map of the solid line is selected, the selected torque map is referred t$_0$, and the travel demanded torque $T_{C\_REC}$ is calculated on the basis of the revolution speed of the travel motor 43. It should be noted that in a case where a transmission is provided, the main controller 100 calculates the travel demanded torque $T_{C\_REC}$ in consideration of the gear ratio of the transmission.

The engine torque distribution calculation section 134 shown in FIG. 4 decides a work target torque $T_{I\_TGT}$ on the basis of the work demanded torque $T_{I\_REQ}$ and the distribution ratio $\eta_I$ of the work driving torque decided by the torque distribution ratio calculation section 133. The work target torque $T_{I\_TGT}$ is calculated by an equation (3).

[Equation 3]

$$T_{I\_TGT} = T_{I\_REQ} \cdot \eta_I \quad (3)$$

The engine torque distribution calculation section 134 decides a travel target torque $T_{C\_TGT}$ on the basis of the travel demanded torque $T_{C\_REC}$ and the distribution ratio $\eta_C$ of the travel driving torque decided by the torque distribution ratio calculation section 133. The travel target torque $T_{C\_TGT}$ is calculated by an equation (4).

[Equation 4]

$$T_{C\_TGT} = T_{C\_REQ} \cdot \eta_C \quad (4)$$

The engine torque distribution calculation section 134 calculates a total target torque value $T_{SUM\_TGT}$, which is the sum of the work target torque $T_{I\_TGT}$, the travel target torque $T_{C\_TGT}$, and the auxiliary machine demanded torque $T_{AUX\_REQ}$ ($T_{SUM\_TGT} = T_{I\_TGT} + T_{C\_TGT} + T_{AUX\_REQ}$). When the total target torque value $T_{SUM\_TGT}$ is equal to or less than the engine output power torque TE, the engine torque distribution calculation section 134 outputs the work target torque $T_{I\_TGT}$ as the work driving torque command $T_{I\_COM}$ and the travel target torque $T_{C\_TGT}$ as the travel driving torque command $T_{C\_COM}$.

On the other hand, the engine torque distribution calculation section 134, when the total target torque value $T_{SUM\_TGT}$ is larger than the engine output power torque TE, decides the work driving torque command $T_{I\_COM}$ and the travel driving torque command $T_{C\_COM}$ such that a total command torque value $T_{SUM\_COM}$, which is the sum of the work driving torque command $T_{I\_COM}$, the travel driving torque command $\eta_{C\_COM}$, and the auxiliary machine demanded torque $T_{AUX\_REQ}$, does not exceed the engine output power torque TE. An example of the decision method will be described below.

The engine torque distribution calculation section 134 outputs a value obtained by subtracting a work driving torque correction value $C_I$, which is obtained by multiplying the amount ($T_{SUM\_TGT}$−TE) by which the total target torque value $T_{SUM\_TGT}$ exceeds the engine output power torque TE by the distribution ratio $\eta_I$, from the work target torque $T_{I\_TGT}$ as the work driving torque command $T_{I\_COM}$. In addition, the engine torque distribution calculation section 134 outputs a value obtained by subtracting a travel driving torque correction value $C_C$, which is obtained by multiplying the amount ($T_{SUM\_TGT}$−TE) by which the total target torque value $T_{SUM\_TGT}$ exceeds the engine output power torque TE by the distribution ratio $\eta_C$, from the travel target torque $T_{C\_TGT}$ as the travel driving torque command $T_{C\_COM}$. Accordingly, the work driving torque command $T_{I\_COM}$ and the travel driving torque command $T_{C\_COM}$ are decided such that the total command torque value $T_{SUM\_COM}$ does not exceed the engine output power torque TE without changing the ratios of the work driving torque command $T_{I\_COM}$ and the travel driving torque command $T_{C\_COM}$.

It should be noted that the decision method of the work driving torque command $T_{L\_COM}$ and the travel driving torque command $T_{C\_COM}$ when the total target torque value $T_{SUM\_TGT}$ is larger than the engine output power torque TE is not limited to this. For example, the work driving torque command $T_{L\_COM}$ and the travel driving torque command $T_{C\_COM}$ may be decided such that the total command torque value $T_{SUM\_COM}$ does not exceed the engine output power torque TE by making a correction to subtract only one of the work target torque $T_{L\_TGT}$ and the travel target torque $T_{C\_TGT}$.

Figure 8:
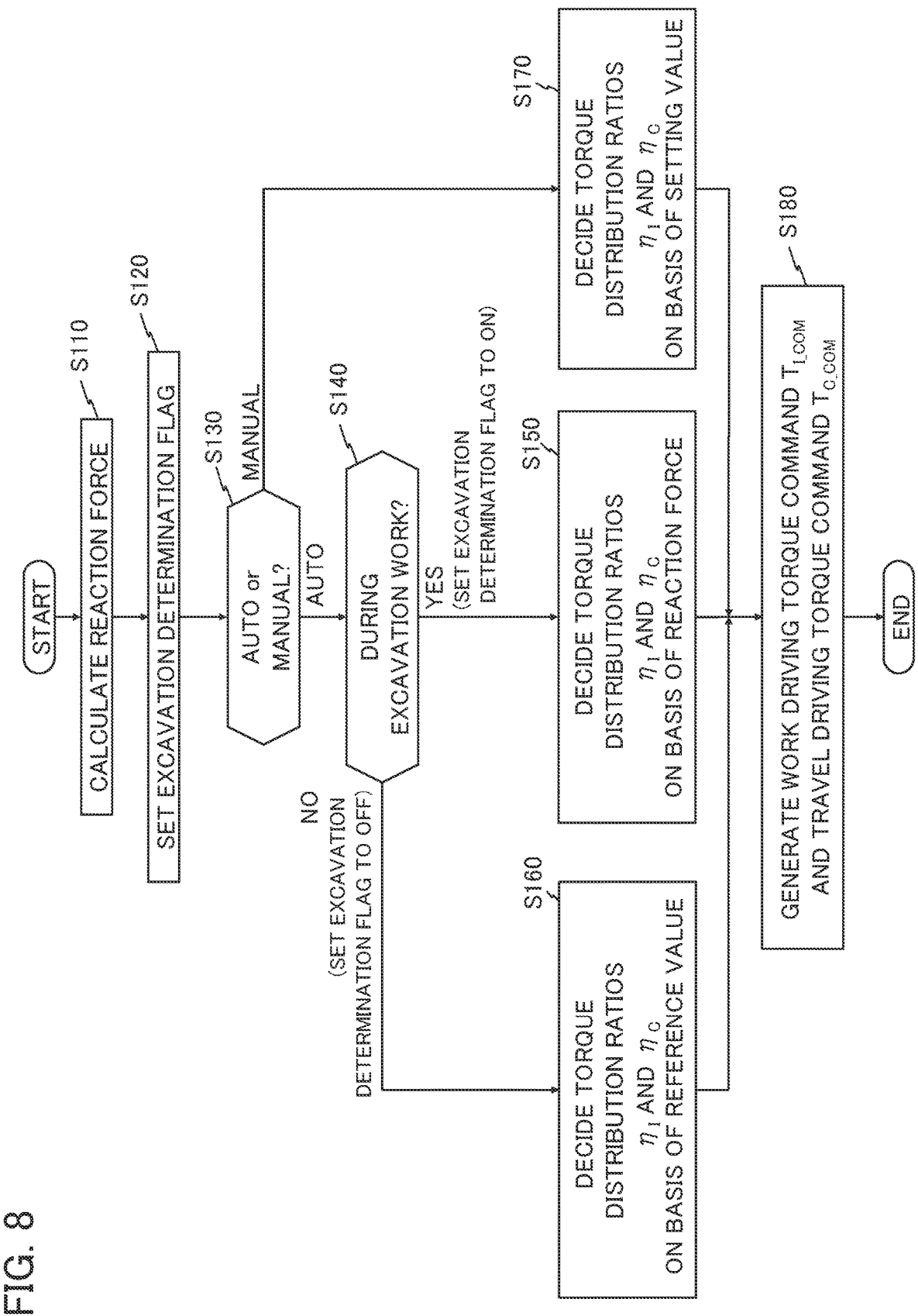
FIG. 8 is a flowchart for showing the content of a torque decision process executed by the main controller.

The content of a torque decision process executed by the main controller 100 will be described with reference to FIG. 8. The process of the flowchart shown in FIG. 8 is started by turning on an ignition switch (engine key switch), and is repeatedly executed in a predetermined control cycle after performing the initial setting that is not shown in the drawing. It should be noted that the excavation determination flag is set to OFF in the initial setting.

As shown in FIG. 8, in Step S110, the main controller 100 calculates the reaction force $F_R$ and proceeds to Step S120.

In Step S120, the main controller 100 performs a setting process of the excavation determination flag. When the bucket angle θ is not within the preset angle range (the lower threshold value θa to the upper threshold value θb), or when the bottom pressure Pa of the arm cylinder 4 is less than the preset pressure threshold value Pa0, the main controller 100 determines that the excavation work has not been started. In this case, the main controller 100 keeps the excavation determination flag OFF.

The main controller 100 determines that the excavation work has been started when the bucket angle θ is within the preset angle range (the lower threshold value θa to the upper threshold value θb), and when the bottom pressure Pa of the arm cylinder 4 is equal to or more than the preset pressure threshold value Pa0. In this case, the main controller 100 switches the excavation determination flag from OFF to ON.

When the setting process of the excavation determination flag is completed, the flow proceeds to Step S130. In Step S130, the main controller 100 determines whether the torque distribution mode is set to either the AUTO mode or the MANUAL mode. If it is determined in Step S130 that the torque distribution mode is set to the AUTO mode, the flow proceeds to Step S140, and if it is determined that the torque distribution mode is set to the MANUAL mode, the flow proceeds to Step S170.

In Step S170, the main controller 100 decides the setting value $\eta_{CS}$ stored in the ROM 105 as the distribution ratio $\eta_C$ and the setting value $\eta_{IS}$ as the distribution ratio $\eta_S$ and proceeds to Step S180.

In Step S140, the main controller 100 determines whether or not the wheel loader 1 is in the state of performing the excavation work. When the excavation determination flag is set to ON in Step S140, it is determined that the wheel loader 1 is in the state of performing the excavation work, and the flow proceeds to Step S150. When the excavation determination flag is set to OFF in Step S140, it is determined that the wheel loader 1 is not in the state of performing the excavation work, and the flow proceeds to Step S160.

In Step S150, the main controller 100 decides the torque distribution ratios $\eta_C$ and $\eta_I$ on the basis of the reaction force $F_R$ and proceeds to Step S180.

In Step S160, the main controller 100 decides a reference value $\eta_C0$ (for example, 50%) as the distribution ratio $\eta_C$ and a reference value $\eta_S0$ (for example, 50%) as the distribution ratio $\eta_S$ and proceeds to Step S180. The reference values $\eta_C0$ and $\eta_S0$ are stored in advance in the ROM 105.

In Step S180, the main controller 100 generates the work driving torque command $T_{L\_COM}$ and the travel driving torque command $T_{C\_COM}$ on the basis of the distribution ratios $\eta_C$ and $\eta_I$, the engine output power torque TE, the auxiliary machine demanded torque $T_{AUX\_REQ}$, the work demanded torque $T_{L\_REQ}$, and the travel demanded torque $T_{C\_REQ}$, and terminates the process shown in the flowchart of FIG. 8.

The work driving torque command $T_{L\_COM}$ generated by the main controller 100 is output to a pump controller that is not shown in the drawing. The pump controller generates a control signal for controlling the delivery capacity (displacement volume) of the hydraulic pump 30A on the basis of the work driving torque command $T_{L\_COM}$ and the delivery pressure of the hydraulic pump 30A. The pump controller controls the delivery capacity of the hydraulic pump 30A by outputting the generated control signal to a regulator that is not shown in the drawing. Accordingly, the work device 6 (the arms 2 and the bucket 3) is driven by the work driving force generated by the hydraulic cylinders 4 and 5. As described above, the main controller 100 according to the embodiment controls the work driving torque by computing the reaction force $F_R$ acting on the wheel loader 1, deciding the distribution ratio $\eta_I$ of the work driving torque on the basis of the reaction force $F_R$, and generating the work driving torque command $T_{L\_COM}$ on the basis of the distribution ratio $\eta_I$.

The travel driving torque command $T_{C\_COM}$ generated by the main controller 100 is output to the travel inverter 42. The travel inverter 42 drives the travel motor 43 on the basis of the travel driving torque command $T_{C\_COM}$. The torque generated by the travel motor 43 is transmitted to the tires 7 configuring a part of the travel device 11 via the power transmission device configuring a part of the travel device 11. Accordingly, the travel device 11 is driven by the travel driving force generated by the travel motor 43. As described above, the main controller 100 according to the embodiment controls the travel driving torque by computing the reaction force $F_R$ acting on the wheel loader 1, deciding the distribution ratio $\eta_C$ of the travel driving torque on the basis of the reaction force $F_R$, and generating the travel driving torque command $\eta_{C\_COM}$ on the basis of the distribution ratio $\eta_C$.

Figure 9:
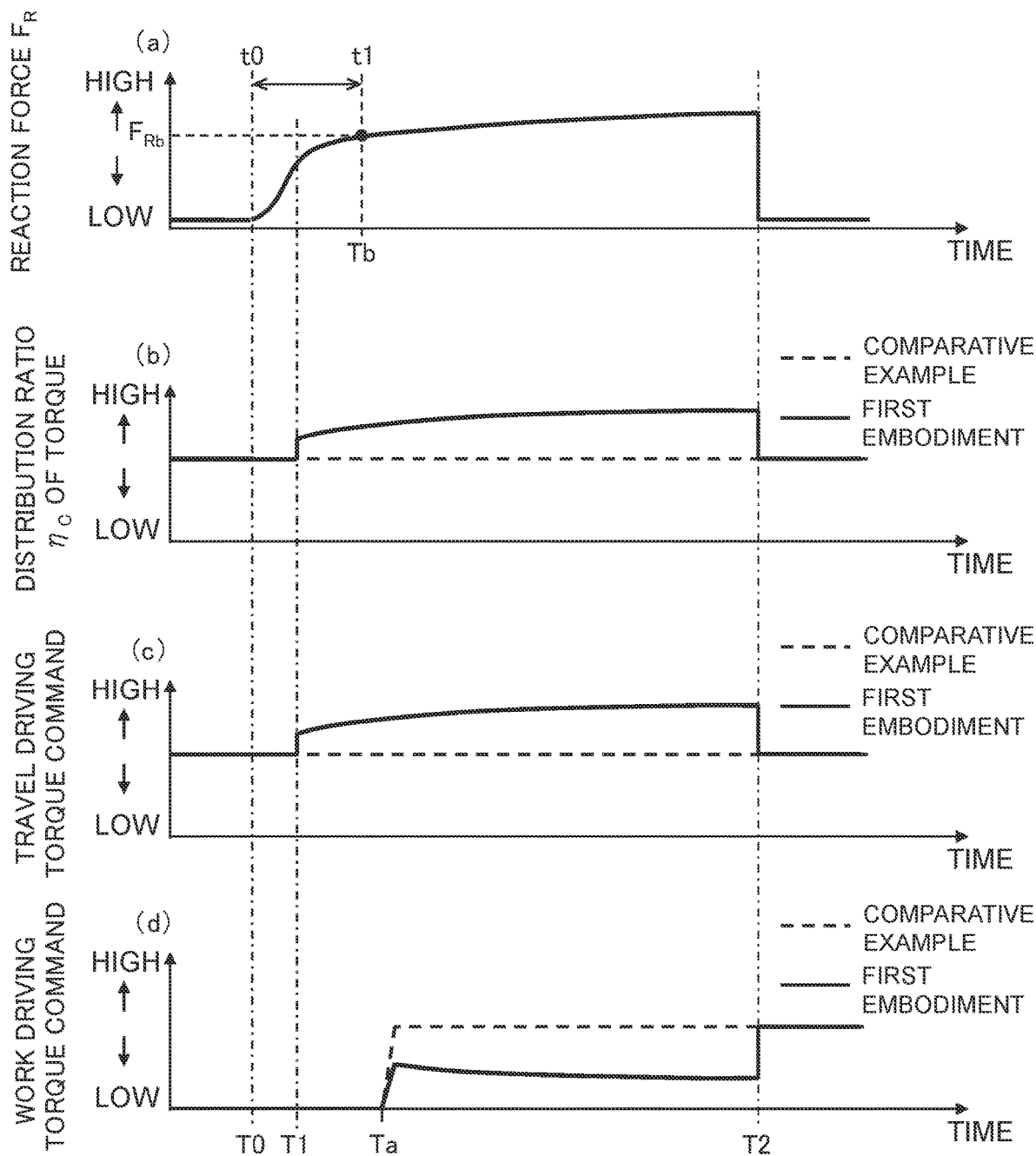
FIG. 9 is time charts for showing the operation of the main controller according to the first embodiment.

With reference to FIG. 9, the travel driving torque command and the work driving torque command when the excavation work is performed by the wheel loader 1 according to the embodiment will be described. FIG. 9 is time charts for showing the operation of the main controller 100 according to the embodiment. In order to clarify working effects of the embodiment, an explanation will be made while comparing with the operation of a main controller of a wheel loader according to a comparative example of the embodiment. It should be noted that the wheel loader according to the comparative example has a configuration in which the AUTO mode is not provided, the distribution ratio $\eta_C$ is set at 50%, the distribution ratio $\eta_I$ is set at 50%, and the distribution ratios $\eta_C$ and $\eta_I$ do not change during the excavation work. In the drawings, the operation of the main controller 100 according to the embodiment is shown by a solid line, and the operation of the main controller according to the comparative example is shown by a broken line.

The horizontal axis in FIG. 9 shows time (elapsed time). The vertical axis in FIG. 9(a) shows the reaction force $F_R$ calculated by the main controller 100, the vertical axis in FIG. 9(b) shows the distribution ratio $\eta_C$ of the travel driving torque decided by the main controller 100, the vertical axis in FIG. 9(c) shows the travel driving torque command $T_{C\_COM}$ generated by the main controller 100, and the vertical axis in FIG. 9(d) shows the work driving torque command $T_{I\_COM}$ generated by the main controller 100.

It should be noted that in both the embodiment and the comparative example, it is assumed that the operation procedure and the operation amount by the operator for various operation members are the same. A time T0 is the time when the wheel loader 1 plunged into the excavation target 91 such as a sediment pile (that is, the time when the penetration of the bucket 3 into the excavation target 91 has been started). That is, the time T0 is the time when the plunge flag has been set to ON. A time T1 is the time when the excavation determination flag has been set to ON, and a time T2 is the time when the excavation determination flag has been set to OFF. A time Ta is the time when the operator has started operating the arm operation lever 52. In addition, it is assumed that the operator has switched the forward/backward switch 51 from the forward position to the backward position at the time T2.

As shown in FIG. 9(a), the reaction force $F_R$ is small until the time T0. This is because since the wheel loader 1 is not brought into contact with the excavation target 91 until the time T0, only the reaction force of the ground (travel surface) during travelling is calculated. At the time T0, since the wheel loader 1 is brought into contact with the excavation target 91, the repulsive force from the excavation target 91 is added. Therefore, the reaction force $F_R$ sharply rises from the time T0. It should be noted that in the embodiment, the reaction force is sequentially calculated with the time T0 as the reference time $t_0$. For example, a reaction force $F_{Rb}$ at a time Tb is calculated by the above equation (1) on the basis of the mass m of the wheel loader 1, the elapsed time $(t_1-t_0)$ from the time T0 (reference time $t_0$), the vehicle velocity $v_0$ at the time T0, and the vehicle velocity $v_1$ and the traction force $F_P$ at the time Tb.

In the comparative example, the distribution ratios $\eta_C$ and $\eta_I$ of the torque are not decided on the basis of the reaction force $F_R$. Therefore, in the comparative example, the distribution ratio $\eta_C$ of the travel driving torque always becomes a constant value as shown in FIG. 9(b). Therefore, as shown in FIG. 9(c), the travel driving torque command also always becomes a constant value.

On the other hand, in the embodiment, as the reaction force $F_R$ becomes larger, the distribution ratio $\eta_C$ of the travel driving torque becomes larger between the time when the excavation determination flag is set to ON and the time when it is set to OFF (from the time T1 to the time T2), that is, during the time when the main controller 100 determines that the excavation work is performed.

Accordingly, as the reaction force $F_R$ becomes larger, the travel driving torque command becomes larger from the time T1 to the time T2. It should be noted that in other periods, the distribution ratio $\eta_C$ and the travel driving torque command of the embodiment are the same as those of the comparative example.

Although not shown in the drawing, the distribution ratio $\eta_I$ of the work driving torque always becomes a constant value in the comparative example. Therefore, as shown in FIG. 9(d), when the operation of the arm operation lever 52 is started (the time Ta) and the arm operation lever 52 is raised up to a predetermined operation amount (for example, the maximum operation amount), the work driving torque command becomes a constant value in the comparative example. On the other hand, in the embodiment, when the arm operation lever 52 is raised up to a predetermined operation amount (for example, the maximum operation amount) and held at that operation amount, the work driving torque command becomes smaller as the reaction force $F_R$ becomes larger. It should be noted that after the time T2, the distribution ratio m returns to the value before the time T1 in the embodiment. Therefore, after the time T2, the work driving torque command in the embodiment becomes the same value as the work driving torque command in the comparative example.

As described above, in the embodiment, the main controller 100 controls the output power of the hydraulic pump 30A and the output power of the travel motor 43 by changing the distribution ratios $\eta_C$ and $\eta_I$ on the basis of the reaction force $F_R$ acting on the vehicle body 8 of the wheel loader 1 during the excavation work to control the work driving torque and the travel driving torque. Therefore, the work efficiency can be improved because the distribution ratios of the travel driving force and the work driving force can be made closer to a distribution ratio suitable for the hardness of the excavation target 91 without depending on the skill level of the operator. In addition, in the embodiment, since the distribution ratios $\eta_C$ and $\eta_I$ are sequentially adjusted, the work efficiency can be improved even in a case where the excavation target 91 contains a plurality of soils with different degrees of hardness. Further, the reaction force $F_R$ acting on the vehicle body 8 of the wheel loader 1 is affected by road surface conditions. Therefore, according to the embodiment, even in a case where the hardness of the excavation target 91 and the road surface conditions change in each excavation cycle or change in real time during the excavation work, the work efficiency can be improved because the torque distribution ratio can be made closer to an appropriate value.

According to the above-described embodiment, the following working effects can be obtained.

(1) A wheel loader (work vehicle) 1 includes: an engine 20 that is mounted on a vehicle body 8; a hydraulic pump 30A that is driven by the engine 20; hydraulic cylinders 4 and 5 that are extended and contracted by pressurized fluid delivered from the hydraulic pump 30A; a work device 6 that is moved according to the extension/contraction operations of the hydraulic cylinders 4 and 5; a travel device 11 that is driven independently of the work device 6; a travel motor (electrically driven motor) 43 that is driven by electric power generated by the engine 20 to operate the travel device 11; and a main controller (controller) 100 that controls the hydraulic cylinders 4 and 5 and the travel motor 43. The controller 100 controls the output power of the hydraulic pump 30A and the output power of the travel motor 43 by changing the distribution ratios $\eta_I$ and $\eta_C$ of a work driving torque (first torque) consumed by the work device 6 and a travel driving torque (second torque) consumed by the travel device 11 among torques output by the engine 20, on the basis of a reaction force $F_R$ received by the vehicle body 8.

Therefore, in a case where the excavation work is repeatedly performed, even when excavating the excavation target 91 with a different degree of hardness, the power of the engine 20 can be appropriately distributed to the work device 6 and the travel device 11. That is, according to the embodiment, the efficiency of the excavation work for the excavation target 91 with a different degree of hardness can be improved.

(2) In addition, even if the skill level of the operator is low and the operation amounts of the arm operation lever 52, the bucket operation lever 53, and the accelerator pedal 58 deviate from appropriate operation amounts, the distribution of the work driving torque and the travel driving torque can be made closer to appropriate distribution. Accordingly, the efficiency of the excavation work can be improved regardless of the skill level of the operator.

(3) The main controller 100 determines whether or not the wheel loader 1 is in the state of performing the excavation work, and while the wheel loader 1 is determined to be in the state of performing the excavation work (that is, while the wheel loader 1 is performing the excavation work), the work driving torque and the travel driving torque are controlled such that as the reaction force $F_R$ becomes larger, the work driving torque becomes smaller and the travel driving torque becomes larger. Accordingly, when the hardness of the excavation target 91 changes in real time, the travel driving torque and the work driving torque can be appropriately set. In addition, according to this configuration, even when the road surface conditions change in real time, the travel driving torque and the work driving torque can be appropriately set.

(4) The wheel loader 1 includes the mode switching switch (mode switching operation section) 57 that can be manually switched between the AUTO mode (first control mode) in which the work driving torque and the travel driving torque are controlled on the basis of the reaction force $F_R$ and the MANUAL mode (second control mode) in which the work driving torque and the travel driving torque are controlled such that the ratios of the work driving torque and the travel driving torque are held at predetermined ratios (for example, the setting values $\eta_{IS}$ and $\eta_{CS}$) regardless of the reaction force $F_R$. Therefore, the operator can properly use the AUTO mode and the MANUAL mode depending on the condition.

Second Embodiment

Figure 10:
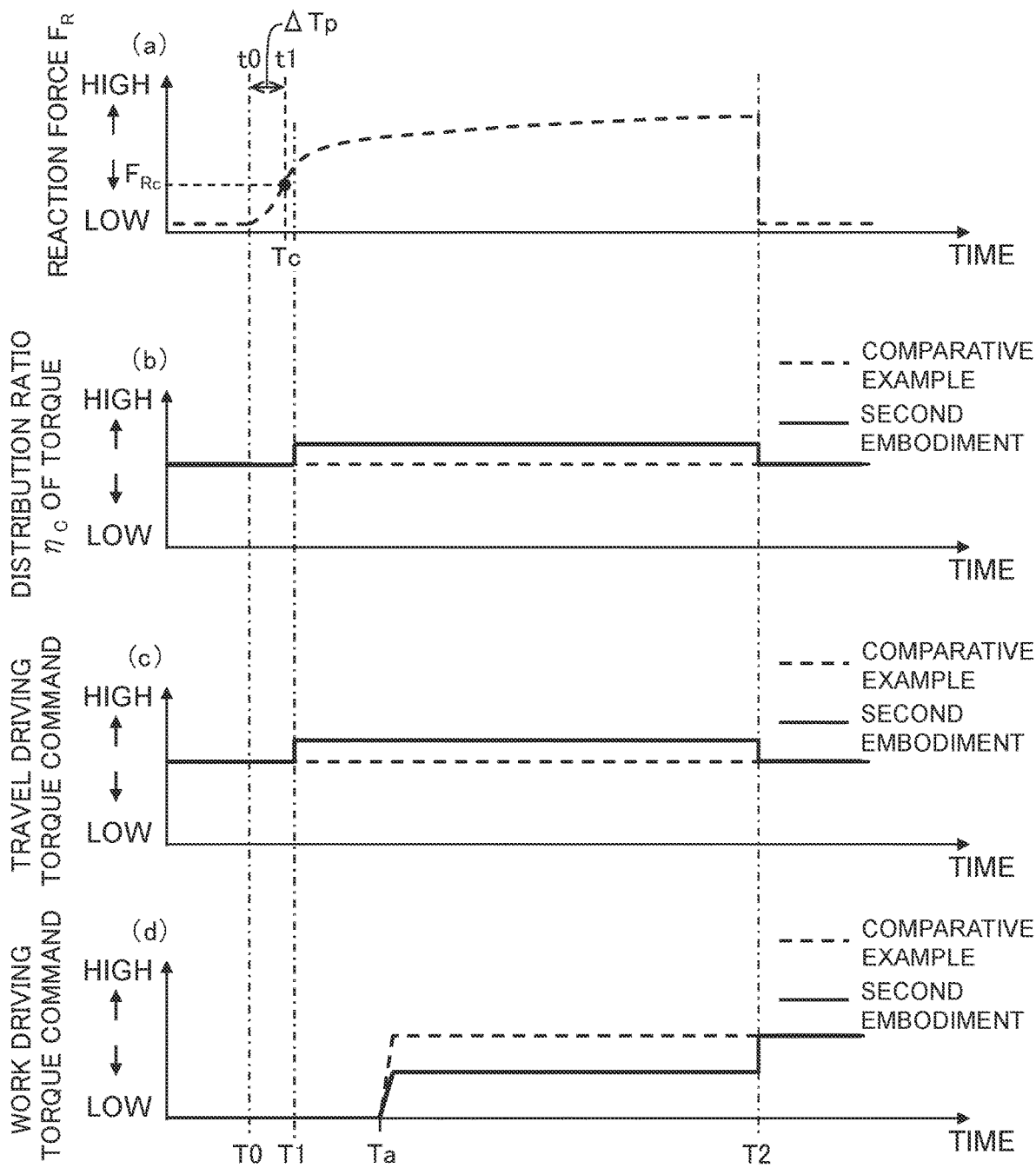
FIG. 10 is time charts for showing the operation of a main controller according to a second embodiment.

A wheel loader 1 according to a second embodiment will be described mainly with reference to FIG. 10. It should be noted that the same or equivalent parts as those in the first embodiment are given the same reference numerals in the drawings, and the differences are mainly explained. FIG. 10 is diagrams similar to FIG. 9 and is time charts for showing the operation of a main controller 100 according to the second embodiment.

The wheel loader 1 according to the second embodiment has a configuration similar to the wheel loader 1 according to the first embodiment, but processes in the torque distribution ratio calculation section 133 are different from the first embodiment. As shown in FIG. 10, the torque distribution ratio calculation section 133 decides the distribution ratio $\eta_I$ of the work driving torque and the distribution ratio $\eta_C$ of the travel driving torque on the basis of a reaction force $F_{RC}$ calculated at a time Tc after the lapse of a predetermined time $\Delta Tp$ from the time T0 when the plunge flag is set to ON. The torque distribution ratios $\eta_I$ and $\eta_C$ are held until the excavation determination flag is switched from ON to OFF. When the excavation determination flag is set from ON to OFF, the controller 100 initializes the distribution ratios $\eta_I$ and $\eta_C$ to the reference values $\eta_I 0$ and $\eta_C 0$.

The predetermined time $\Delta Tp$ can be appropriately set according to the work content and performance of the wheel loader 1, the calculation ability of the main controller 100, and the like. In order to increase calculation accuracy, a long predetermined time $\Delta Tp$ is better, and by securing, for example, about 0.1 seconds, the reaction force $F_{RC}$ can be calculated with a certain degree of calculation accuracy. In addition, the time (the time T0 to the time T2) from when the wheel loader 1 plunges into the excavation target 91 to the end of the excavation work is approximately 5 seconds. Therefore, it is preferable that the value of the predetermined time $\Delta Tp$ is 0.1 seconds or more and 5 seconds or less.

In addition, the time from plunging the wheel loader 1 into the excavation target 91 to starting to raise the arms 2 is approximately 0.5 seconds, and the time from plunging the wheel loader 1 into the excavation target 91 to starting the crowding operation of the bucket 3 is approximately 1.5 seconds. Therefore, it is more preferable to set the predetermined time $\Delta Tp$ in the range of 0.5 seconds or more and 1.5 seconds or less. In particular, by setting the predetermined time $\Delta Tp$ to about 0.5 seconds, the torque distribution ratio can be quickly fixed and reflected in the work driving torque command and the travel driving torque command.

The torque distribution ratio calculation section 133 holds the distribution ratios $\eta_I$ and $\eta_C$ calculated on the basis of the reaction force $F_{RC}$ calculated at the time Tc until the excavation determination flag is switched from ON to OFF. Accordingly, even if the reaction force acting on the wheel loader 1 temporarily becomes smaller than the reaction force $F_{RC}$ by releasing the accelerator pedal 58 or moving back the vehicle body during the excavation work, the distribution ratios $\eta_I$ and $\eta_C$ of the torque do not fluctuate. Accordingly, in a case where the wheel loader 1 is moved forward and backward a plurality of times to scoop up the sediment in a single excavation work, appropriate torque distribution ratios $\eta_I$ and $\eta_C$ can be set in advance during the second and subsequent scooping up work of the sediment.

As described above, the main controller 100 according to the second embodiment controls the work driving torque and the travel driving torque such that it is determined whether or not the wheel loader 1 has plunged into the excavation target 91, the distribution ratios $\eta_I$ and $\eta_C$ of the work driving torque and the travel driving torque are decided on the basis of the reaction force $F_{RC}$ after the elapse of the predetermined time $\Delta Tp$ from the time when being determined that the wheel loader 1 has plunged into the excavation target 91 (from the time when the plunge flag has been set to ON), and the distribution ratios $\eta_I$ and $\eta_C$ are held until the excavation work is finished (until the excavation determination flag is set from ON to OFF).

According to such a second embodiment, the excavation work can be performed with more work patterns. That is, according to the second embodiment, in addition to the working effects similar to the first embodiment, the degree of freedom of the excavation work can be improved.

Third Embodiment

Figure 11:
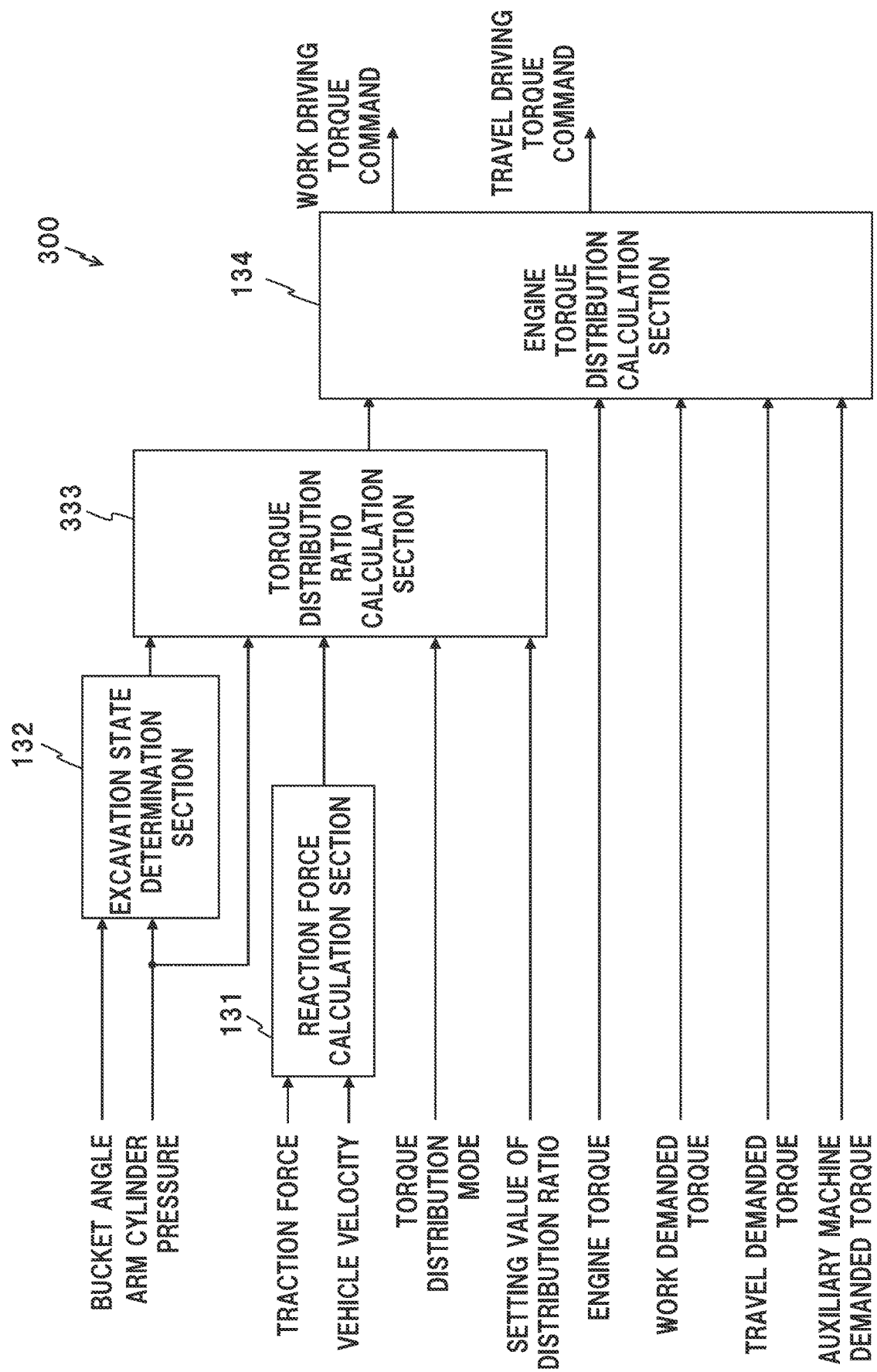
FIG. 11 is a functional block diagram of a main controller according to a third embodiment.

A wheel loader 1 according to a third embodiment will be described mainly with reference to FIG. 11 and FIG. 12. It should be noted that the same or equivalent parts as those in the first embodiment are given the same reference numerals in the drawings, and the differences are mainly explained. FIG. 11 is a diagram similar to FIG. 4 and is a functional block diagram of a main controller 300 according to the third embodiment.

As shown in FIG. 2, in the hydraulic fluid line connecting the bottom-side hydraulic fluid chamber (not shown) of the arm cylinder 4 and the front device control section 31 to each other, a relief valve 72 is provided to regulate the maximum pressure of the bottom pressure Pa of the arm cylinder 4 to a preset relief pressure. If the bottom pressure Pa of the arm cylinder 4 rises to the relief pressure during the process in which the wheel loader 1 plunges into the excavation target 91 and the bucket 3 is penetrated into the excavation target 91, there is a risk that the raising operation of the arms 2 is not appropriately performed. Thus, in the third embodiment, the raising operation of the arms 2 is appropriately performed by deciding the distribution ratios $\eta_I$ and $\eta_C$ of the torque in consideration of the bottom pressure Pa of the arm cylinder 4.

As shown in FIG. 11, the torque distribution ratio calculation section 333, when the excavation determination flag is set to ON, calculates the distribution ratios $\eta_I$ and $\eta_C$ of the torque on the basis of the reaction force $F_R$ and the bottom pressure Pa of the arm cylinder 4.

Figure 12:
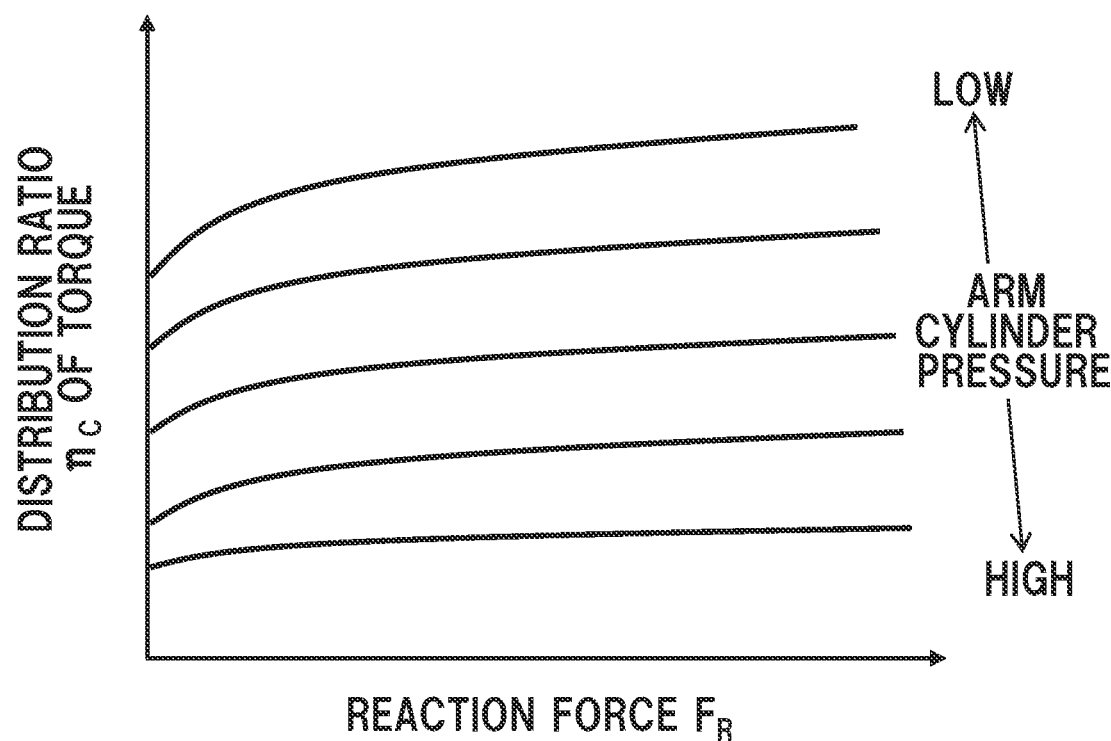
FIG. 12 is a diagram for showing a torque distribution ratio table according to the third embodiment.

FIG. 12 is a diagram similar to FIG. 6 and showing a torque distribution ratio table according to the third embodiment. As shown in FIG. 12, a plurality of torque distribution ratio tables according to the magnitude of the bottom pressure Pa of the arm cylinder 4 are stored in the ROM 105 such that the distribution ratio $\eta_C$ of the travel driving torque changes according to the magnitude of the bottom pressure Pa of the arm cylinder 4.

The main controller 300 selects a torque distribution ratio table corresponding to the magnitude of the bottom pressure Pa of the arm cylinder 4 and decides the distribution ratio $\eta_C$ of the travel driving torque on the basis of the reaction force $F_R$. The torque distribution ratio table is set such that as the reaction force $F_R$ becomes larger, the distribution ratio $\eta_C$ of the travel driving torque becomes larger and as the bottom pressure Pa of the arm cylinder 4 becomes higher, the distribution ratio $\eta_C$ of the travel driving torque becomes smaller.

Therefore, in the wheel loader 1 according to the third embodiment, since the bottom pressure Pa of the arm cylinder 4 is small at the beginning of the penetration of the bucket 3 into the excavation target 91, the distribution ratio $\eta_C$ of the travel driving torque becomes large. Then, since the bottom pressure Pa of the arm cylinder 4 becomes large from the middle to the end of the penetration of the bucket 3 into the excavation target 91, the distribution ratio $\eta_C$ of the travel driving torque becomes small.

As described above, the main controller 300 according to the third embodiment controls the travel driving torque such that as the pressure of the arm cylinder (hydraulic cylinder) 4 for operating the arms 2 becomes larger, the travel driving torque becomes smaller. Since the bottom pressure Pa of the arm cylinder 4 can be lowered by making the travel driving torque smaller as the bottom pressure Pa of the arm cylinder 4 becomes closer to the relief pressure, the lifting operation of the arms 2 can be appropriately performed.

According to such a third embodiment, when the sediment put in the bucket 3 is heavy or the arm raising operation is delayed, the raising operation of the arms 2 (lifting of the bucket 3) being inoperable due to reaching of the bottom pressure Pa of the arm cylinder 4 to the maximum pressure (relief pressure) by an increase in the travel driving force can be prevented or delayed. Therefore, according to the third embodiment, in addition to the working effects similar to the first embodiment, it is possible to suppress a decrease in the efficiency of the excavation work from the middle to the end of the penetration of the bucket 3 into the excavation target 91.

It should be noted that, in the embodiment, the method of deciding the distribution ratio $\eta_C$ of the travel driving torque by selecting a table according to the bottom pressure Pa of the arm cylinder 4 from among the plurality of torque distribution ratio tables has been described, but the method of deciding the distribution ratio $\eta_C$ is not limited to this. For example, a reference distribution ratio is decided on the basis of the torque distribution ratio table described in the first embodiment, and the distribution ratio $\eta_C$ may be decided by multiplying the reference distribution ratio by a factor preset according to the bottom pressure Pa of the arm cylinder 4.

Fourth Embodiment

Figure 13:
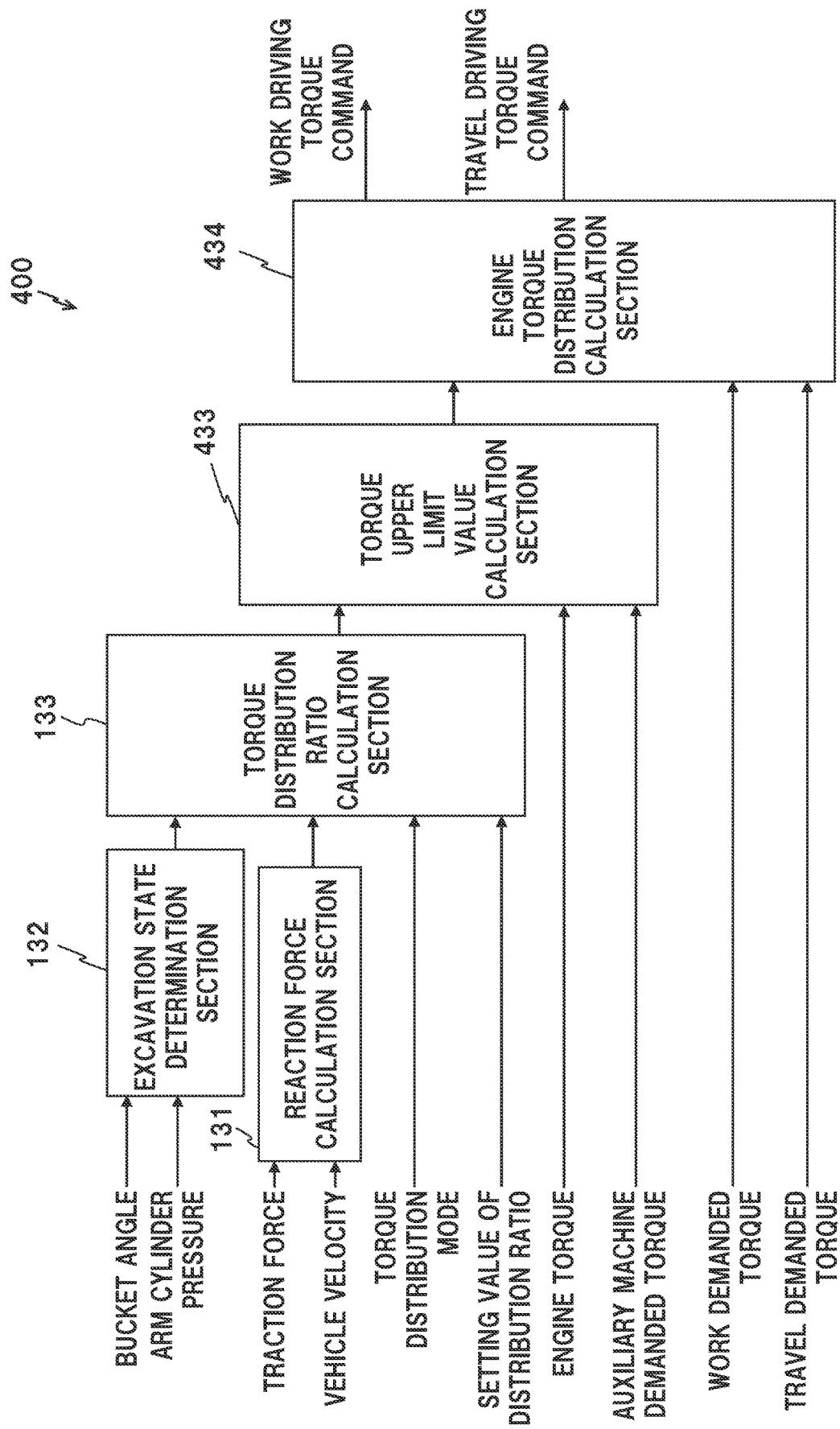
FIG. 13 is a functional block diagram of a main controller according to a fourth embodiment.

A wheel loader 1 according to a fourth embodiment will be described mainly with reference to FIG. 13. It should be noted that the same or equivalent parts as those in the first embodiment are given the same reference numerals in the drawing, and the differences are mainly explained. FIG. 13 is a diagram similar to FIG. 4 and is a functional block diagram of a main controller 400 according to the fourth embodiment.

The main controller 400 according to the fourth embodiment further has a function as a torque upper limit value calculation section 433 for deciding the upper limit value $T_{I\_LIM}$ of the work driving torque and the upper limit value $T_{C\_LIM}$ of the travel driving torque.

The torque upper limit value calculation section 433 calculates a difference value ΔTE, which is the value obtained by subtracting the auxiliary machine demanded torque $T_{AUX\_REQ}$ from the engine output power torque TE (ΔTE=TE−$T_{AUX\_REQ}$).

The torque upper limit value calculation section 433 calculates a work driving torque upper limit value $T_{I\_LIM}$ by multiplying the distribution ratio $\eta_I$ of the work driving torque decided by the torque distribution ratio calculation section 133 by the difference value ΔTE ($T_{I\_LIM}$=ΔTE·$\eta_I$).

The torque upper limit value calculation section 433 calculates a travel driving torque upper limit value $T_{C\_LIM}$ by multiplying the distribution ratio $\eta_C$ of the travel driving torque decided by the torque distribution ratio calculation section 133 by the difference value ΔTE ($T_{C\_LIM}$=ΔTE·$\eta_C$).

The engine torque distribution calculation section 434 decides the work target torque $T_{I\_TGT}$ on the basis of the work demanded torque $T_{I\_REQ}$ and the work driving torque upper limit value $T_{I\_LIM}$ decided by the torque upper limit value calculation section 433. The work target torque $T_{I\_TGT}$ is calculated by an equation (5).

[Equation 5]

$$T_{I\_TGT} = \begin{cases} T_{I\_REQ} & (T_{I_{REQ}} \le T_{I\_LIM}) \\ T_{I\_LIM} & (T_{I\_REQ} > T_{I\_LIM}) \end{cases} \quad (5)$$

The engine torque distribution calculation section 434 decides the travel target torque $T_{C\_TGT}$ on the basis of the travel demanded torque $T_{C\_REC}$ and the travel driving torque upper limit value $T_{C\_LIM}$ decided by the torque upper limit value calculation section 433. The travel target torque $T_{C\_TGT}$ is calculated by an equation (6).

[Equation 6]

$$T_{C\_TGT} = \begin{cases} T_{C\_REQ} & (T_{C\_REQ} \le T_{C\_LIM}) \\ T_{C\_LIM} & (T_{C\_REQ} > T_{C\_LIM}) \end{cases} \quad (6)$$

As described above, the main controller 400 according to the fourth embodiment decides the upper limit value $T_{I\_LIM}$ of the work driving torque and the upper limit value $T_{C\_LIM}$ of the travel driving torque on the basis of the reaction force $F_R$, and controls the work driving torque and the travel driving torque on the basis of the upper limit value $T_{I\_LIM}$ of the work driving torque and the upper limit value $T_{C\_LIM}$ of the travel driving torque. That is, the main controller 400 can change the distribution ratios of the work driving torque and the travel driving torque on the basis of the reaction force $F_R$ by controlling the work driving torque and the travel driving torque on the basis of the work driving torque upper limit value $T_{I\_LIM}$ and the travel driving torque upper limit value $T_{C\_LIM}$.

In the fourth embodiment, when the work demanded torque and the travel demanded torque exceed the upper limit values ($T_{I\_LIM}$ and $T_{C\_LIM}$) during the excavation work, the work driving torque and the travel driving torque are controlled such that the distribution ratios of the work driving torque and the travel driving torque become close to proper distribution ratios. Accordingly, the work driving torque and the travel driving torque intended by the operator can be generated until the upper limit values are exceeded. For operators who feel such a configuration easier to handle, the work efficiency can be improved over the first embodiment.

In addition, in the fourth embodiment, the travel demanded torque reaches the upper limit value of the travel driving torque when the operation amount of the accelerator pedal 58 is smaller than the maximum operation amount, or the work demanded torque reaches the upper limit value of the work driving torque when the operation amounts of the arm operation lever 52 and the bucket operation lever 53 are smaller than the maximum operation amounts. Therefore, it is possible to reduce the frequency at which the operator steps on the accelerator pedal 58 to maximize the operation amount of the accelerator pedal 58 or the operator tilts the arm operation lever 52 and the bucket operation lever 53 until the operation amounts of the arm operation lever 52 and the bucket operation lever 53 are maximized. As a result, the total operation amount by the operator can be decreased, and the burden on the operator can be reduced.

Fifth Embodiment

Figure 14:
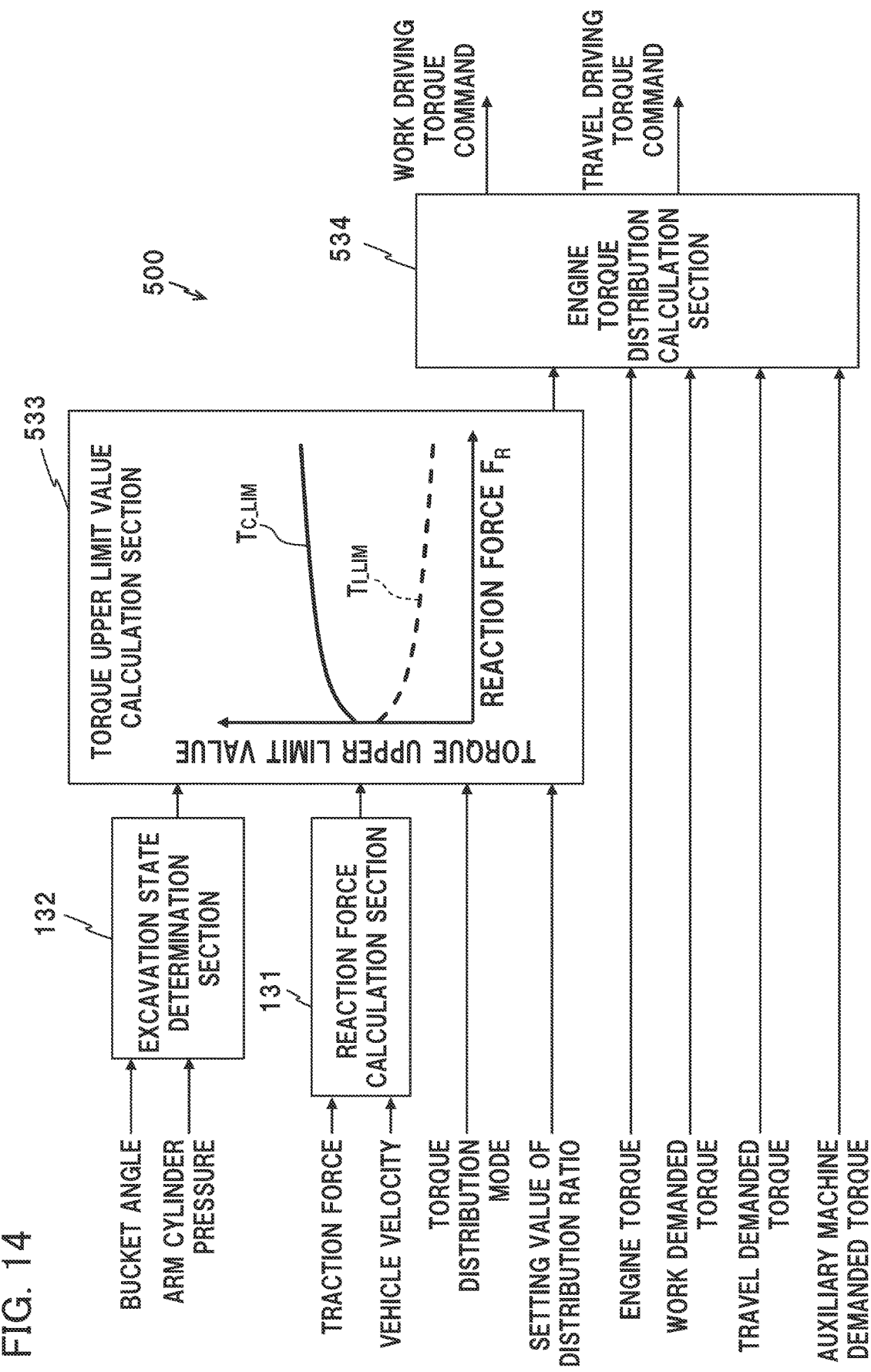
FIG. 14 is a functional block diagram of a main controller according to a fifth embodiment.

A wheel loader 1 according to a fifth embodiment will be described mainly with reference to FIG. 14. It should be noted that the same or equivalent parts as those in the first embodiment are given the same reference numerals in the drawings, and the differences are mainly explained. FIG. 14 is a diagram similar to FIG. 4 and is a functional block diagram of a main controller 500 according to the fifth embodiment.

The main controller 500 according to the fifth embodiment has, instead of the torque distribution ratio calculation section 133 of the main controller 100 according to the first embodiment, a function as a torque upper limit value calculation section 533 for deciding the upper limit value $T_{I\_LIM}$ of the work driving torque and the upper limit value $T_{C\_LIM}$ of the travel driving torque.

The torque upper limit value calculation section 533 computes the torque upper limit values $T_{I\_LIM}$ and $T_{C\_LIM}$ on the basis of the reaction force $F_R$. For example, the torque upper limit value calculation section 533 refers to a preset upper limit value table, and computes the torque upper limit values $T_{I\_LIM}$ and $T_{C\_LIM}$ on the basis of the reaction force $F_R$. The upper limit value table is defined in advance by experiments and the like and stored in the ROM 105.

The upper limit value table of the travel driving torque is a table having characteristics in which as the reaction force $F_R$ becomes larger, the travel driving torque upper limit value $T_{C\_LIM}$ becomes larger. In addition, the upper limit value table of the travel driving torque is set such that as the reaction force $F_R$ becomes larger, the ratio (inclination) of an increase in the travel driving torque upper limit value $T_{C\_LIM}$ an increase in the reaction force $F_R$ becomes smaller. The upper limit value table of the work driving torque is a table having characteristics in which as the reaction force $F_R$ becomes larger, the work driving torque upper limit value $T_{I\_LIM}$ becomes smaller. In addition, the upper limit value table of the work driving torque is set such that as the reaction force $F_R$ becomes larger, the ratio (inclination) of an increase in the work driving torque upper limit value $T_{I\_LIM}$ to an increase in the reaction force $F_R$ becomes larger.

The engine torque distribution calculation section 534 decides the work target torque $T_{I\_TGT}$ by using the above equation (5) on the basis of the work demanded torque $T_{I\_REQ}$ and the work driving torque upper limit value $T_{I\_LIM}$ decided by the torque upper limit value calculation section 533.

The engine torque distribution calculation section 534 decides the travel target torque $T_{C\_TGT}$ by using the above equation (6) on the basis of the travel demanded torque $T_{C\_REQ}$ and the travel driving torque upper limit value $T_{C\_LIM}$ decided by the torque upper limit value calculation section 533.

As described above, the main controller 500 according to the fifth embodiment can change the distribution ratios of the work driving torque and the travel driving torque on the basis of the reaction force $F_R$ by controlling the work driving torque and the travel driving torque on the basis of the work driving torque upper limit value $T_{I\_LIM}$ and the travel driving torque upper limit value $T_{C\_LIM}$. According to such a fifth embodiment, the working effects similar to the fourth embodiment can be obtained.

The following modified examples are also within the scope of the present invention, and it is possible to combine the configurations shown in the modified examples with the configurations described in the above-described embodiments, to combine the configurations described in the above-described different embodiments with each other, or to combine the configurations described in the following different modified examples with each other.

Modified Example 1

The calculation method of the work driving torque command $T_{I\_COM}$ and the travel driving torque command $T_{C\_COM}$ is not limited to the method described in the above embodiments. As a modified example of the first embodiment, the engine torque distribution calculation section 134 may calculate the work driving torque command $T_{I\_COM}$ and the travel driving torque command $T_{C\_COM}$ on the basis of the distribution ratios $\eta_C$ and $\eta_I$ calculated by the torque distribution ratio calculation section 133, the engine output power torque TE, the auxiliary machine demanded torque $T_{AUX\_REQ}$, the work demanded torque $T_{I\_REQ}$, and the travel demanded torque $T_{C\_REQ}$, as will be described below.

The engine torque distribution calculation section 134 calculates a total demanded torque value $T_{SUM\_REQ}$, which is the sum of the work demanded torque $T_{I\_REQ}$, the travel demanded torque $T_{C\_REC}$, and the auxiliary machine demanded torque $T_{AUX\_REQ}$ ($T_{SUM\_REQ} = T_{I\_REQ} + T_{C\_REQ} + T_{AUX\_REQ}$).

The engine torque distribution calculation section 134, when the total demanded torque value $T_{SUM\_REQ}$ is equal to or less than the engine output power torque TE, sets the work demanded torque $T_{I\_REC}$ as the work target torque $T_{I\_TGT}$ and the travel demanded torque $T_{C\_REC}$ as the travel target torque $T_{C\_TGT}$.

The engine torque distribution calculation section 134, when the total demanded torque value $T_{SUM\_REQ}$ is larger than the engine output power torque TE, calculates the work target torque $T_{L\_TGT}$ and the travel target torque $T_{C\_TGT}$ by subtracting a predetermined amount from the work demanded torque $T_{L\_REQ}$ and the travel demanded torque $T_{C\_REQ}$ in accordance with the torque distribution ratio η by the difference value ΔTE between the total demanded torque value $T_{SUM\_REQ}$ and the engine output power torque TE. In this case, the engine torque distribution calculation section 134 makes the total target torque value $T_{SUM\_TGT}$, which is the sum of the auxiliary machine demanded torque $T_{AUX\_REQ}$, the work target torque $T_{L\_TGT}$, and the travel target torque $T_{C\_TGT}$, equal to the engine output power torque TE.

According to such a modified example, the maximum values of the travel driving force and the work driving force are not reduced even when the excavation determination flag is set to ON. Therefore, the wheel loader 1 can be operated as more intended by the operator while improving the work efficiency. According to the modified example, the work efficiency can be improved as similar to the first embodiment, and the operability of the vehicle body can be further improved.

Modified Example 2

As a modified example of the first embodiment, the engine torque distribution calculation section 134 may calculate the work target torque $T_{L\_TGT}$ by an equation (7) and the travel target torque $T_{C\_TGT}$ by an equation (8).

[Equation 7]

$$T_{L\_TGT} = T_{L\_REQ} \cdot \eta_I \cdot k \quad (7)$$

[Equation 8]

$$T_{C\_TGT} = T_{C\_REQ} \cdot \eta_C \cdot k \quad (8)$$

In the equation, k is a constant and stored in advance in the ROM 105. For example, when k is 1, the work target torque $T_{L\_TGT}$ becomes the value equal to or less than the work demanded torque $T_{L\_REQ}$, and the travel target torque $T_{C\_TGT}$ becomes the value equal to or less than the travel demanded torque $T_{C\_REC}$. For example, when k is set to 1, when $\eta_I$ is 50% and $\eta_C$ is 50%, the work target torque $T_{L\_TGT}$ becomes the value half the work demanded torque $T_{L\_REQ}$, and the travel target torque $T_{C\_TGT}$ becomes the value half the travel demanded torque $T_{C\_REC}$. On the other hand, when k is larger than 1, the work target torque $T_{L\_TGT}$ and the travel target torque $T_{C\_TGT}$ can be made larger, and thus it is possible to be made closer to the work driving force and the travel driving force intended by the operator. For example, when k is set to 2, when $\eta_I$ is 50% and $\eta_C$ is 50%, the work target torque $T_{L\_TGT}$ becomes the value of the work demanded torque $T_{L\_REQ}$, and the travel target torque $T_{C\_TGT}$ becomes the value of the travel demanded torque $T_{C\_REC}$. It should be noted that the value of k may be optionally set by the operator by manual operation.

Modified Example 3

In the second embodiment described with reference to FIG. 10, an example of deciding the distribution ratio $\eta_I$ of the work driving torque and the distribution ratio $\eta_C$ of the travel driving torque on the basis of the reaction force $F_{RC}$ calculated at the time Tc after the lapse of the predetermined time ΔTp from the time T0 when the plunge flag is set to ON has been described. As a modified example, the reaction force $F_R$ is sequentially calculated after the plunge flag is set to ON, and when the reaction force $F_R$ decreases after the excavation determination flag is set to ON, the distribution ratio $\eta_I$ of the work driving torque and the distribution ratio $\eta_C$ of the travel driving torque decided on the basis of the reaction force $F_R$ at that time may be held until the excavation determination flag is set to OFF. Accordingly, as similar to the second embodiment, in a case where the wheel loader 1 is moved forward and backward a plurality of times to scoop up the sediment in a single excavation work, appropriate torque distribution ratios $\eta_I$ and $\eta_C$ can be set in advance during the second and subsequent scooping up work of the sediment.

Modified Example 4

In the above embodiments, an example in which the power generation inverter 41 and the travel inverter 42 are connected to each other via the DC section 44 has been described, but the present invention is not limited to this. The power generation inverter 41 and the travel inverter 42 may be power converters without via a DC section as represented by a matrix converter.

Modified Example 5

In the above embodiments, an example of the wheel loader 1 without a power storage device connected to the DC section 44 has been described, but the present invention is not limited to this. The present invention can also be applied to a wheel loader having a configuration in which the voltage of the DC section 44 is controlled or electric power is supplied by connecting a power storage device including a power storage element such as a secondary battery or a capacitor to the DC section 44.

Modified Example 6

In the above embodiments, an example of calculating the traction force $F_P$ on the basis of the equation (2) has been described, but the present invention is not limited to this. For example, the bottom pressure Pa of the arm cylinder 4 is proportional to the traction force $F_P$. Therefore, the traction force $F_P$ may be calculated on the basis of the bottom pressure Pa of the arm cylinder 4 sensed by the pressure sensor 71. In addition, an acceleration sensor is attached to the wheel loader 1, and the traction force $F_P$ may be calculated on the basis of the acceleration sensed by the acceleration sensor and the mass of the wheel loader 1.

Modified Example 7

The method of determining that the excavation work has been started is not limited to the method described in the above embodiments. For example, it may be determined that the excavation work has been started in consideration of the reaction force $F_R$ calculated by the reaction force calculation section 131. For example, the excavation state determination section 132 determines that the excavation work has been started when the bucket 3 is within the angle range indicating that the bucket 3 is in the plunging posture, the bottom pressure Pa of the arm cylinder 4 is equal to or more than the pressure threshold value Pa0, and the reaction force $F_R$ is equal to or more than a predetermined reaction force threshold value. Accordingly, it is possible to reduce the occurrence of erroneous determination in which it is determined as the excavation state when the excavation work is not being performed. In addition, instead of the determination method described in the above embodiments, it may be determined whether or not the excavation work has been started on the basis of image data photographed by a camera (photographing device) for monitoring the front of the wheel loader 1. It may be determined whether or not the excavation work has been started on the basis of information sensed by an infrared sensor for monitoring the front of wheel loader 1.

Modified Example 8

In the above embodiments, an example in which after it is determined that the excavation work has been started, it is determined that the excavation work has been finished when the bucket angle θ becomes the angle threshold value θe or larger has been described, but the present invention is not limited to this. For example, it may be determined that the excavation work has been finished when the time after being determined that the excavation work has been started has passed a preset time threshold value (for example, about 5 seconds). The time threshold value is stored in advance in the ROM 105. The time threshold value is defined in advance by experiments and the like.

Modified Example 9

In the first embodiment, an example in which as shown in FIG. 8, the main controller 100 decides the distribution ratio $\eta_I$ of the work driving torque and the distribution ratio $\eta_C$ of the travel driving torque on the basis of the reference values $\eta_I 0$ and $\eta_C 0$ in Step S160, and decides the distribution ratio $\eta_I$ of the work driving torque and the distribution ratio $\eta_C$ of the travel driving torque on the basis of the setting values $\eta_{IS}$ and $\eta_{CS}$ set by the torque distribution ratio setting dial 54 in Step S170 has been described.

However, in Step S160, the main controller 100 may decide the distribution ratio $\eta_I$ of the work driving torque and the distribution ratio $\eta_C$ of the travel driving torque on the basis of the setting values $\eta_{IS}$ and $\eta_{CS}$ set by the torque distribution ratio setting dial 54. In addition, in Step S170, the main controller 100 may decide the distribution ratio $\eta_I$ of the work driving torque and the distribution ratio $\eta_C$ of the travel driving torque on the basis of the reference values $\eta_I 0$ and $\eta_C 0$. It should be noted that in both Steps S160 and S170, in a case where the distribution ratios $\eta_I$ and $\eta_C$ are decided on the basis of the reference values $\eta_I 0$ and $\eta_C 0$, the torque distribution ratio setting dial 54 can be omitted.

Modified Example 10

In the above embodiments, an example in which the main controllers 100, 300, 400, and 500 calculate the reaction force $F_R$ acting on the vehicle body 8 of the wheel loader 1 and decides the torque distribution ratio and the torque upper limit value on the basis of the calculated reaction force $F_R$ has been described, but the present invention is not limited to this. The main controllers may calculate the physical quantity correlated with the reaction force $F_R$ acting on the wheel loader 1 and decide the torque distribution ratio and the torque upper limit value on the basis of the calculated physical quantity. As the physical quantity correlated with the reaction force $F_R$, for example, the bottom pressure Pa of the arm cylinder 4 can be used. In a case where the torque distribution ratio and the torque upper limit value are decided on the basis of the physical quantity correlated with the reaction force $F_R$ as described above, it can be said that the main controllers control the work driving torque and the travel driving torque on the basis of the reaction force received by the vehicle body 8 of the wheel loader 1. Accordingly, it is possible to set the torque distribution ratio during the excavation work on a work site where the ground is inclined from the horizontal plane in the same manner as the torque distribution ratio during the excavation work on a work site where the ground is parallel to the horizontal plane. That is, the effect of the inclination of the ground can be reduced.

Modified Example 11

In the first embodiment, an example of sequentially calculating the reaction force $F_R$ on the basis of the vehicle velocity v of the wheel loader 1 has been described, but the calculation method of the reaction force $F_R$ is not limited to this. The time change ratio of the vehicle velocity v at the beginning of penetration into the excavation target 91 is compared with the time change ratio of the vehicle velocity v stored in advance in the ROM 105, and when the both match each other, the reaction force $F_R$ may be decided from a reaction force calculation data table stored in the ROM 105. The reaction force calculation data table is defined in advance for each time change ratio of a plurality of vehicle velocities v (that is, for each of a plurality of vehicle velocity change patterns) by experiments and the like.

Modified Example 12

In the above embodiments, the values used for various determinations and calculations may be subjected to moving average processing or low-pass filter processing in order to avoid the effects of disturbance and noise.

Modified Example 13

Some or all of the functions of the main controllers described in the above embodiments may be realized by hardware (for example, by designing the logic to execute each function using an integrated circuit).

Although the embodiments of the present invention have been described above, the above embodiments show only a part of applications of the present invention, and the technical scope of the present invention is not intended to be limited to the specific configuration of the above embodiments. The above-described embodiments and modified examples are exemplified for the purpose of clearly describing the present invention and are not necessarily limited to those having all the described configurations. In addition, it is possible to replace a part of the configuration of one embodiment or modified example with the configuration of another embodiment or modified example, and to add the configuration of one embodiment or modified example to the configuration of another embodiment or modified example. It should be noted that the control lines and the information lines considered to be necessary in the explanation are shown in the drawings, but all the necessary control lines and information lines in a product are not necessarily shown. In practice, almost all the configurations may be considered to be connected to each other.

DESCRIPTION OF REFERENCE CHARACTERS

1: Wheel loader (work vehicle)
2: Arm
3: Bucket
4: Arm cylinder (hydraulic cylinder)
5: Bucket cylinder (hydraulic cylinder)
6: Work device
8: Vehicle body
11: Travel device
20: Engine
30A: Hydraulic pump
40: Power generation motor
43: Travel motor (electrically driven motor)
57: Mode switching switch (mode switch operation section)
100, 300, 400, 500: Main controller (controller)

The invention claimed is:

1. A work vehicle comprising:
   an engine that is mounted on a vehicle body;
   a hydraulic pump that is driven by the engine;
   hydraulic cylinders that are extended and contracted by pressurized fluid delivered from the hydraulic pump;
   a work device that is moved according to the extension/contraction operations of the hydraulic cylinders;
   a travel device that is driven independently of the work device;
   an electrically driven motor that is driven by electric power generated by the engine to operate the travel device; and
   a controller that controls the hydraulic cylinders and the electrically driven motor on a basis of a distribution ratio of a first torque and a distribution ratio of a second torque, the first torque being consumed by the work device among torques output by the engine, the second torque being consumed by the travel device among torques output by the engine, wherein
   the controller is configured to:
   calculate a reaction force received by the vehicle body when the work vehicle penetrates into an excavation target on a basis of a traction force and a vehicle velocity of the vehicle body;
   determine the distribution ratio of the first torque and the distribution ratio of the second torque such that as the calculated reaction force received by the vehicle body becomes larger, the first torque becomes smaller, the second torque becomes larger, and a ratio of an increase in the distribution ratio of the second torque to an increase in the reaction force received by the vehicle body becomes smaller, while the work vehicle is performing excavation work; and
   control output power of the hydraulic pump and output power of the electrically driven motor on the basis of the determined distribution ratio of the first torque and the determined distribution ratio of the second torque.

2. The work vehicle according to claim 1, wherein the controller is configured to:
   decide an upper limit value of the first torque and an upper limit value of the second torque on the basis of the reaction force; and
   control the first torque and the second torque on a basis of the upper limit value of the first torque and the upper limit value of the second torque.

3. The work vehicle according to claim 1, wherein the controller is configured to:
   decide the distribution ratio of the first torque and the distribution ratio of the second torque on the basis of the reaction force after elapse of a predetermined time from penetrating of the work vehicle into the excavation target; and
   control the first torque and the second torque such that the distribution ratio of the first torque and the distribution ratio of the second torque are held until excavation work is finished.

4. The work vehicle according to claim 1, wherein
   the work device has arms attached to the vehicle body and a bucket attached to the arms, and
   the controller controls the second torque such that as a pressure of the hydraulic cylinders for operating the arms becomes larger, the second torque becomes smaller.

5. The work vehicle according to claim 1, further comprising:
   a mode switch operation section that can manually switch between a first control mode in which the first torque and the second torque are controlled on the basis of the reaction force and a second control mode in which the first torque and the second torque are controlled such that ratios of the first torque and the second torque are held at predetermined ratios regardless of the reaction force.

* * * * *